United States Patent

Blesser

[11] Patent Number: 4,694,471
[45] Date of Patent: Sep. 15, 1987

[54] DIGITAL DATA COMMUNICATING

[76] Inventor: Barry A. Blesser, RFD 2, Box 335, Raymond, N.H. 03077

[21] Appl. No.: 859,318

[22] Filed: May 5, 1986

[51] Int. Cl.$^4$ .............................................. H04L 27/10
[52] U.S. Cl. ........................................ 375/45; 375/62; 375/88
[58] Field of Search ............... 375/8, 9, 45, 62, 65, 375/88, 122, 78, 80, 44; 370/69.1, 122

[56] References Cited

U.S. PATENT DOCUMENTS

| | | | |
|---|---|---|---|
| 4,336,613 | 6/1982 | Hewes | 375/9 |
| 4,394,626 | 7/1983 | Kurihara et al. | 375/118 |
| 4,517,519 | 5/1985 | Mukaiyama | 375/45 |
| 4,539,524 | 9/1985 | Goode | 375/88 |

Primary Examiner—Robert L. Griffin
Assistant Examiner—M. Huseman
Attorney, Agent, or Firm—Charles Hieken

[57] ABSTRACT

A digital data communications system transmits digital data over a telephone line using frequency multiplexing for the different channels. Each channel includes a receiver and a transmitter coupled to the telephone line at spaced points. Each transmitter includes an FSK modulator, a bandpass filter of controllable bandwidth centered about 5 kHz with its bandwidth controlled by a bandwidth select signal related to the bandwidth needed to transmit data over that channel. A mixer combines the output of the bandpass filter with a local oscillator signal of frequency related to the selected channel to provide a difference frequency signal that is applied to a lowpass filter having a cutoff at 3 kHz that is coupled to the telephone line. Each receiver includes a lowpass filter having a cutoff at 3 kHz that couples the line to a mixer. The mixer combines the input signal with a local oscillator signal of frequency related to that of an associated transmitter to provide a receiver intermediate frequency signal at 5 kHz that is applied to a bandpass filter of controllable bandwidth that receives a bandwidth select signal. The bandwidth select signal controls the bandwidth in accordance with the frequency of the receiver local oscillator so as to be the same as the bandwidth selected at the transmitter for that particular frequency channel. The output of the bandpass filter is coupled to an FSK demodulator that provides the digital data on its output corresponding to that applied at the input of the associated transmitter.

35 Claims, 18 Drawing Figures

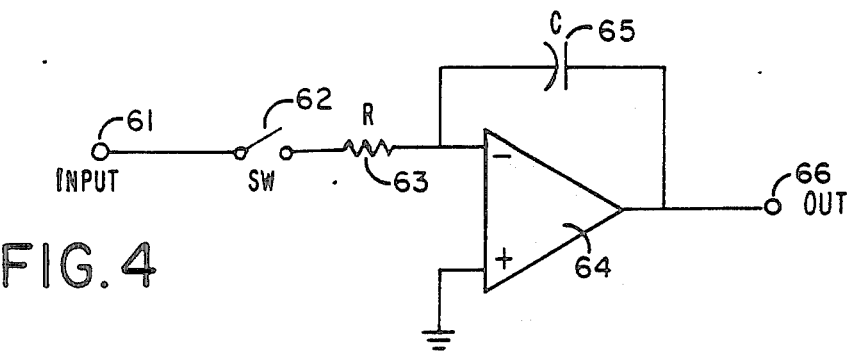
FIG. 4
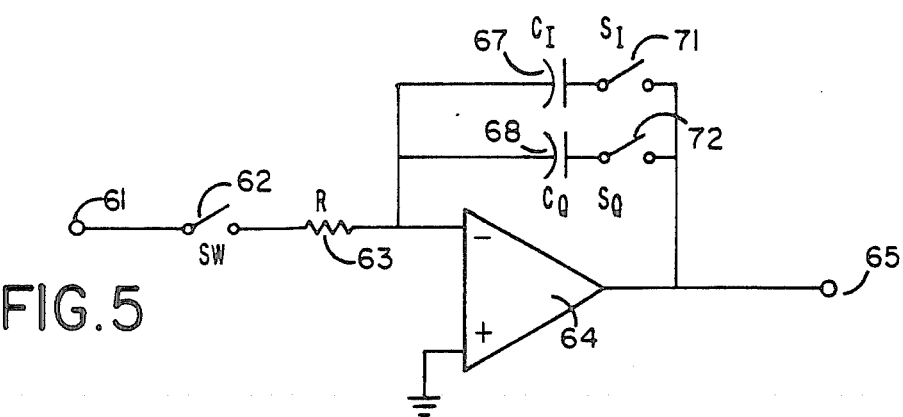
FIG. 5
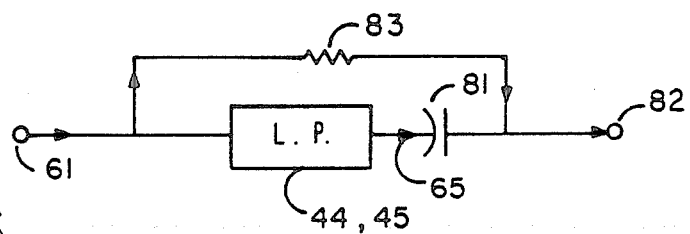
FIG. 6
FIG. 7A
FIG. 7B
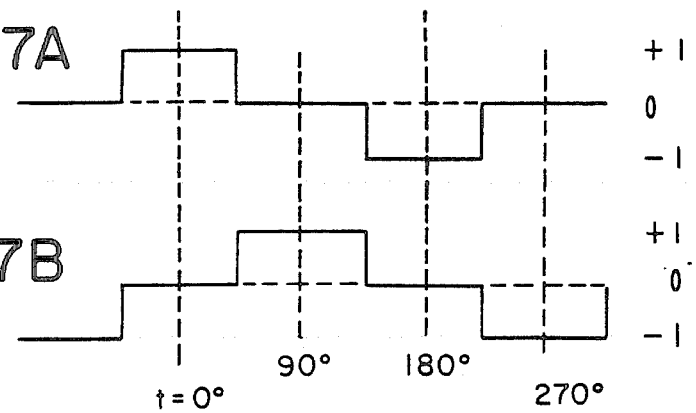

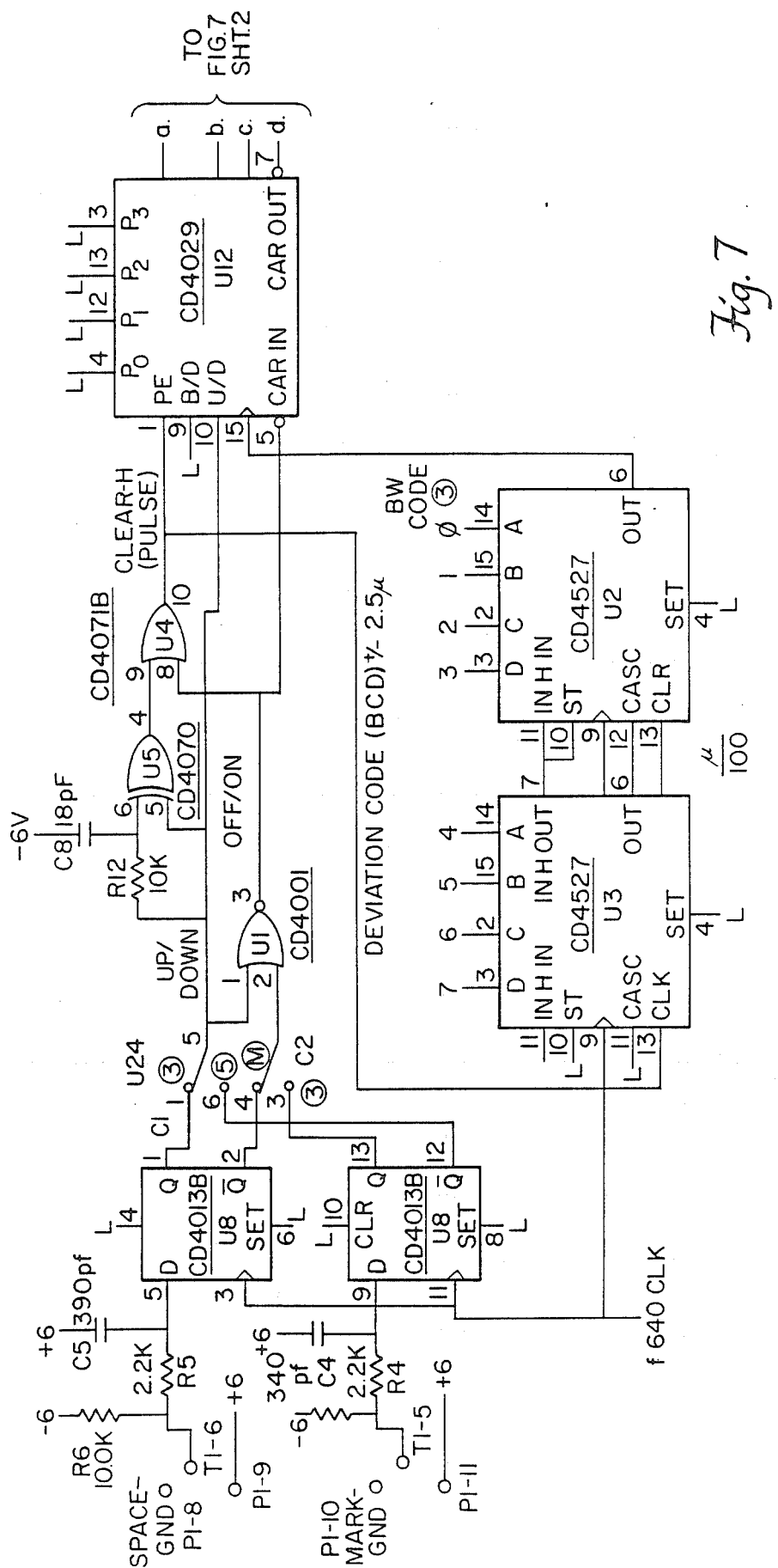

SHT. 2 OF 2

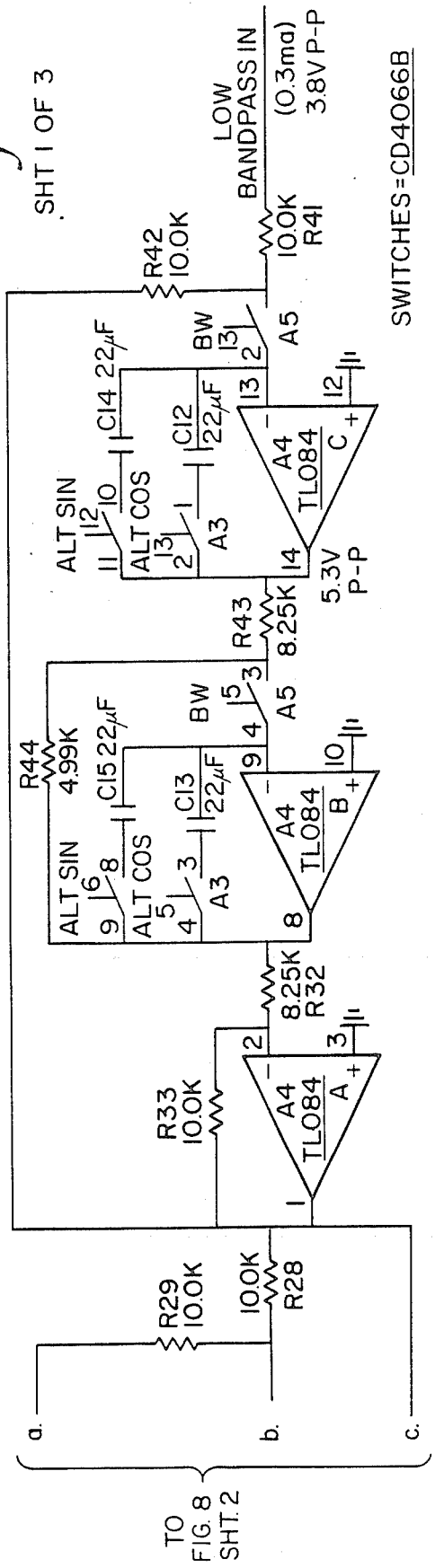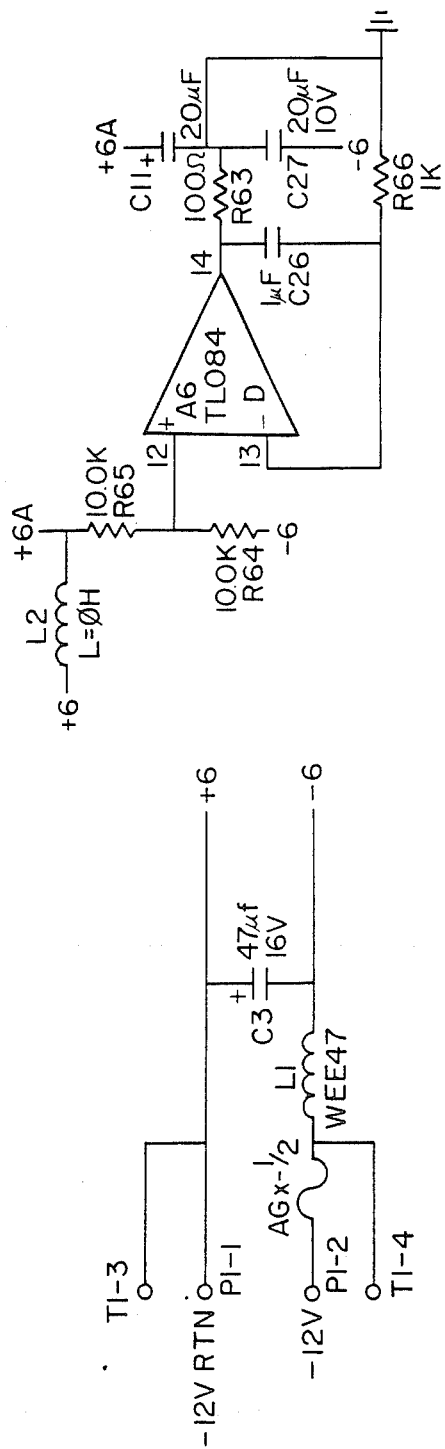
Fig. 8 SHT 1 OF 3

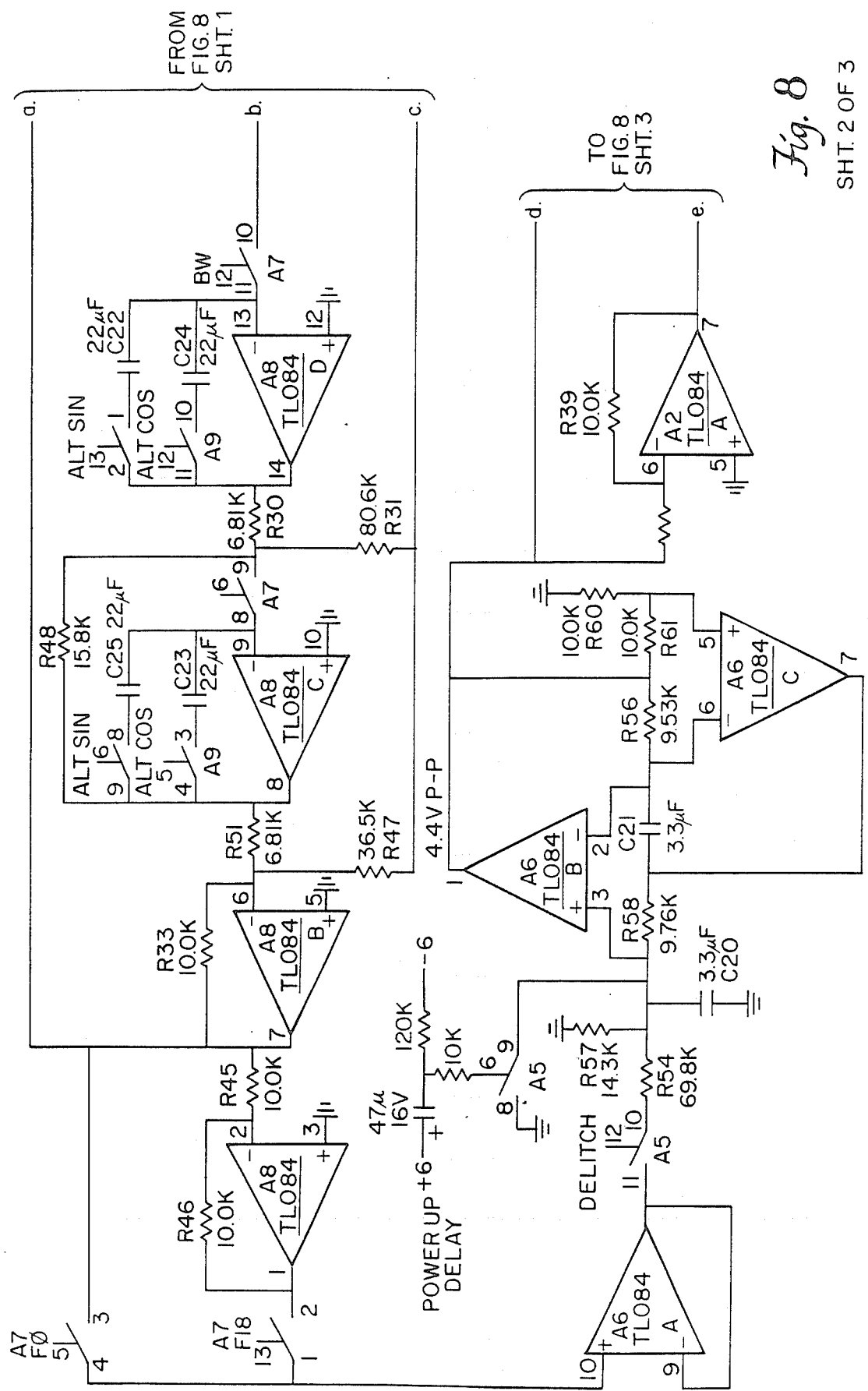
Fig. 8 SHT. 2 OF 3

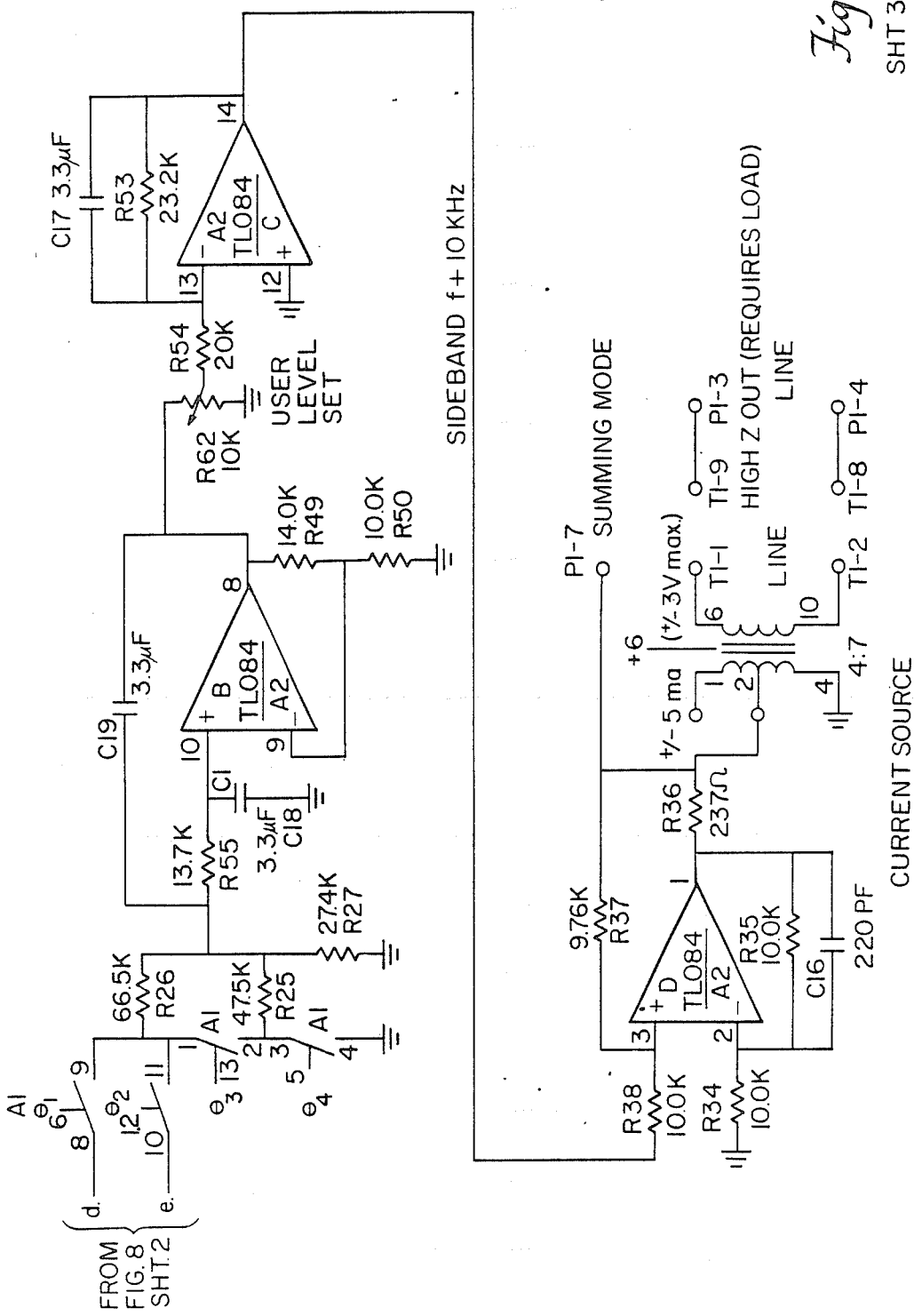

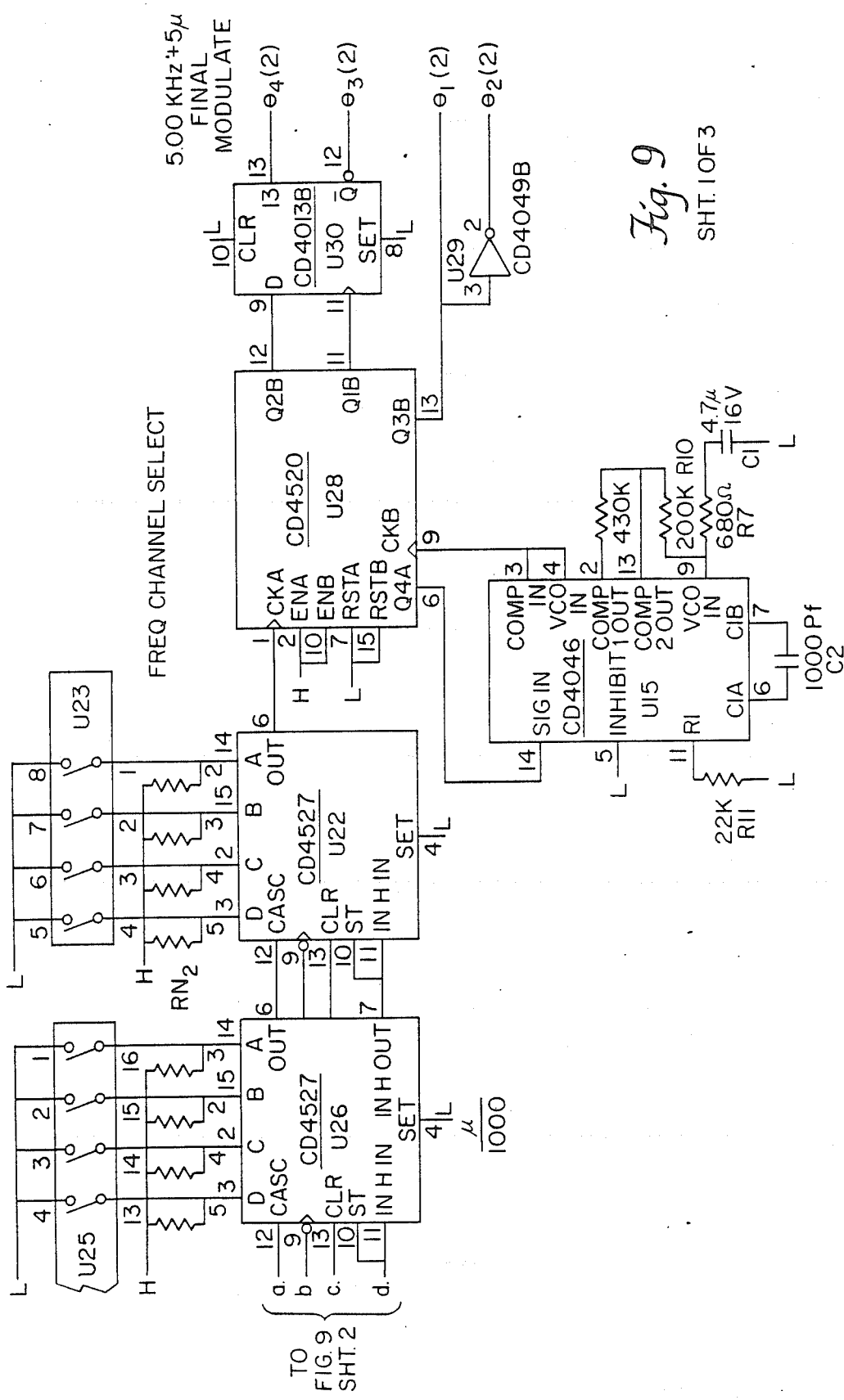
Fig. 9 SHT. 1 OF 3

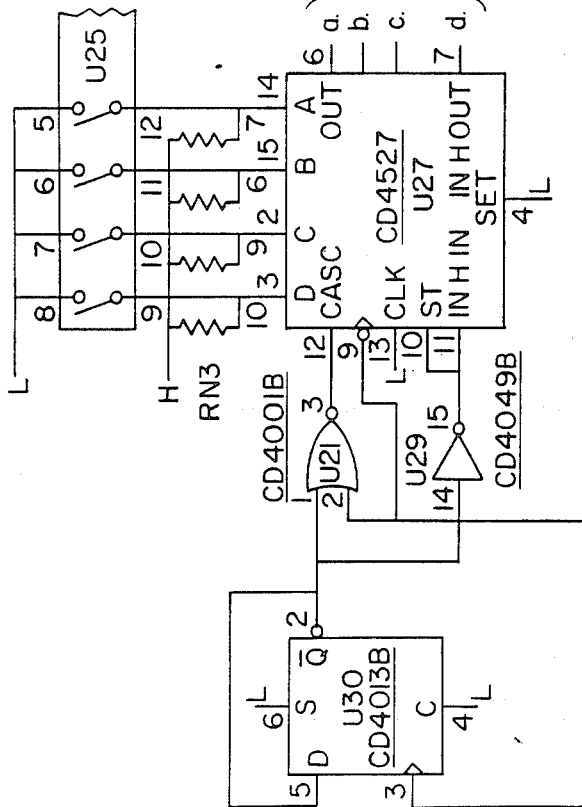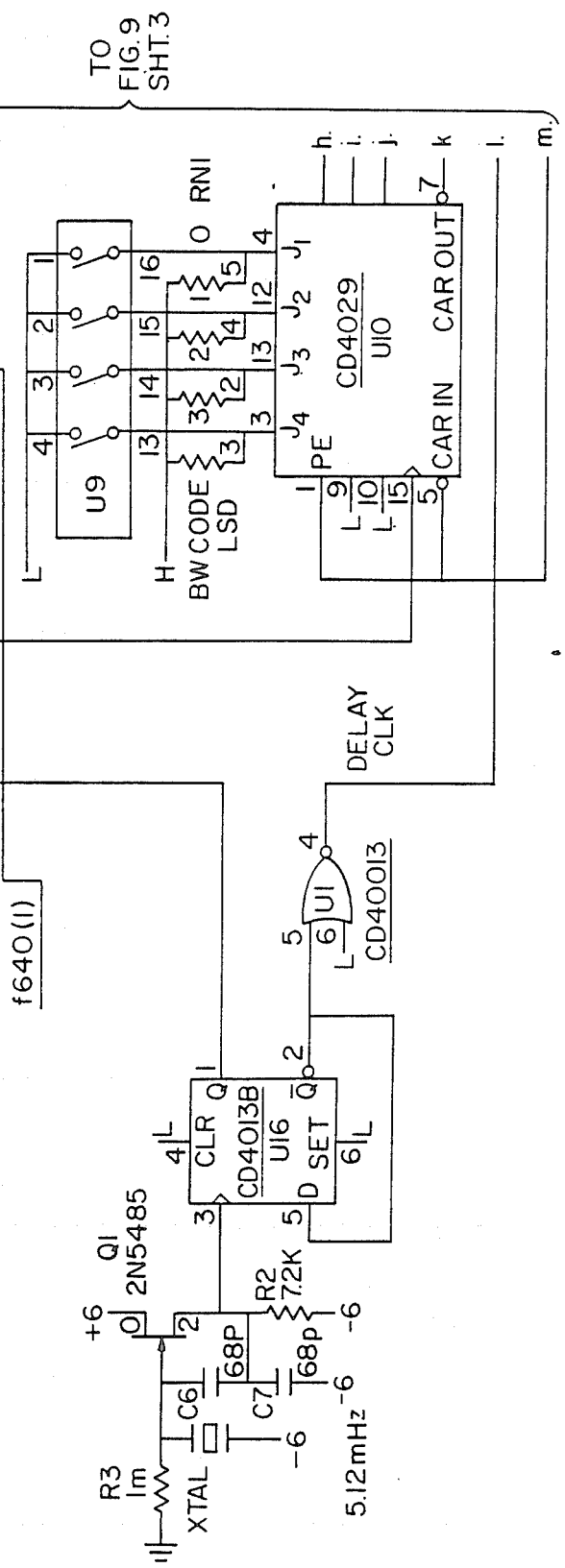
Fig. 9 SHT. 2 OF 3

SHT 3 OF 3

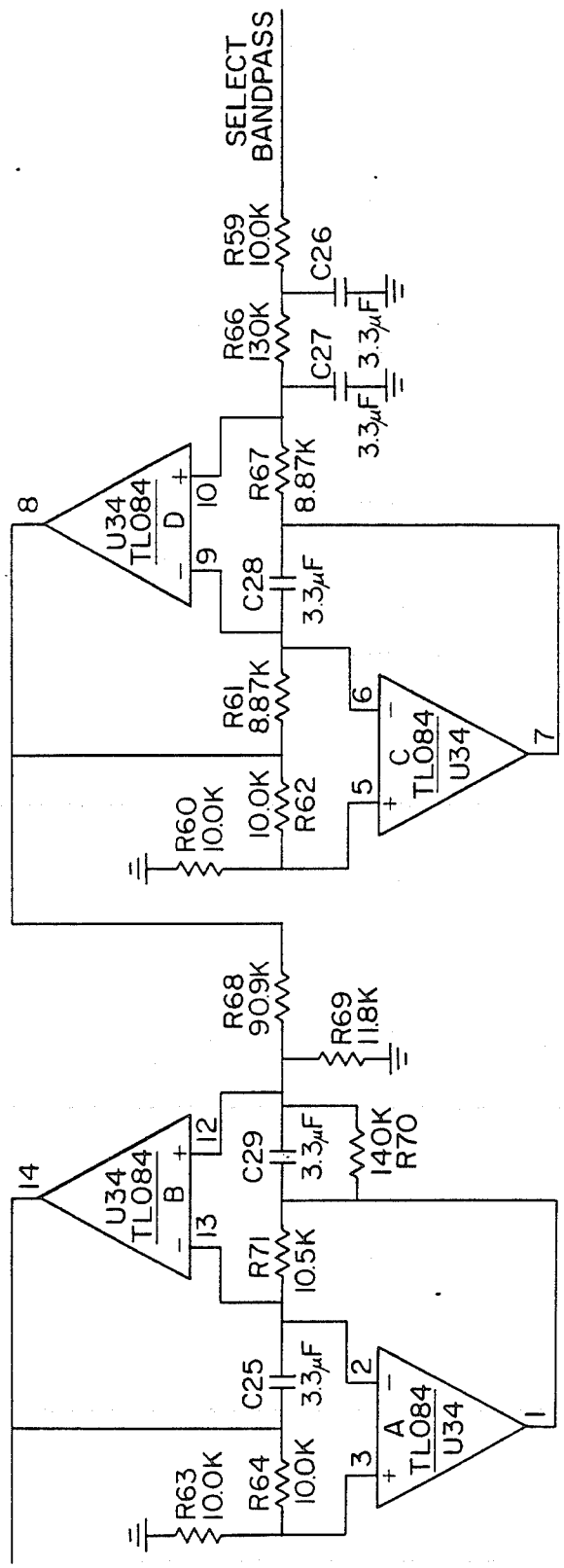
Fig. 10 SHT 1 OF 4

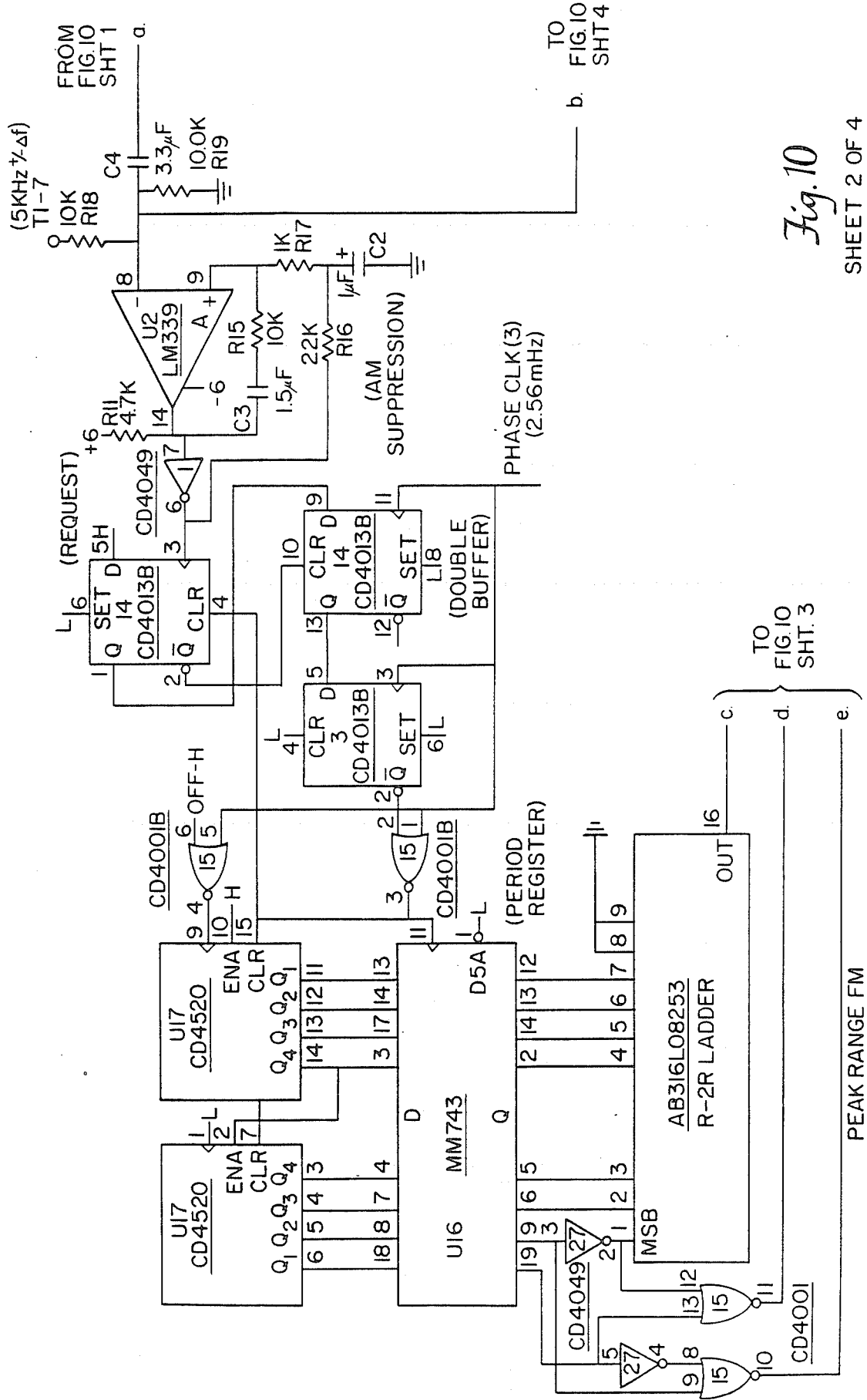
Fig. 10 SHEET 2 OF 4

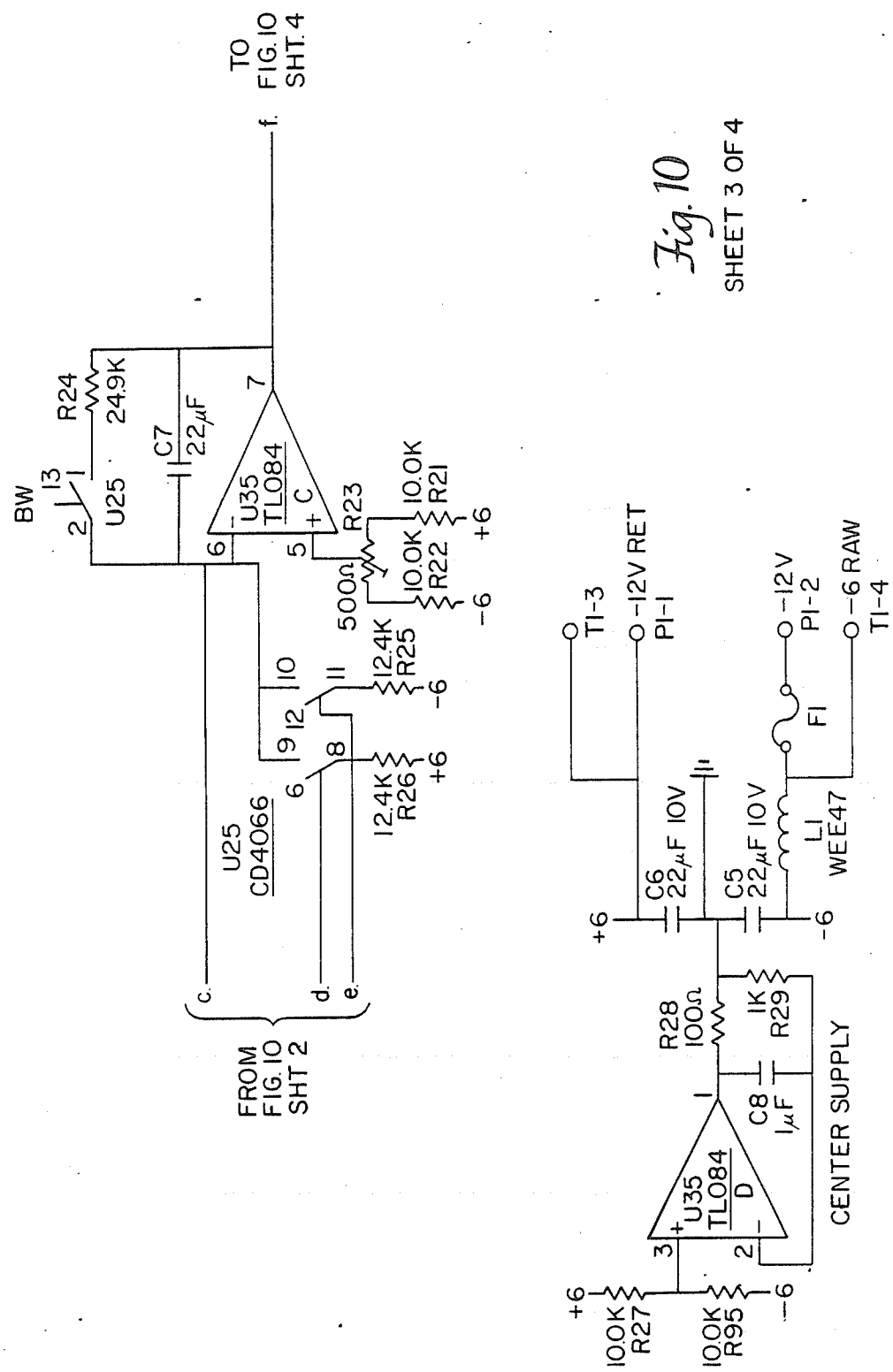
Fig. 10 SHEET 3 OF 4

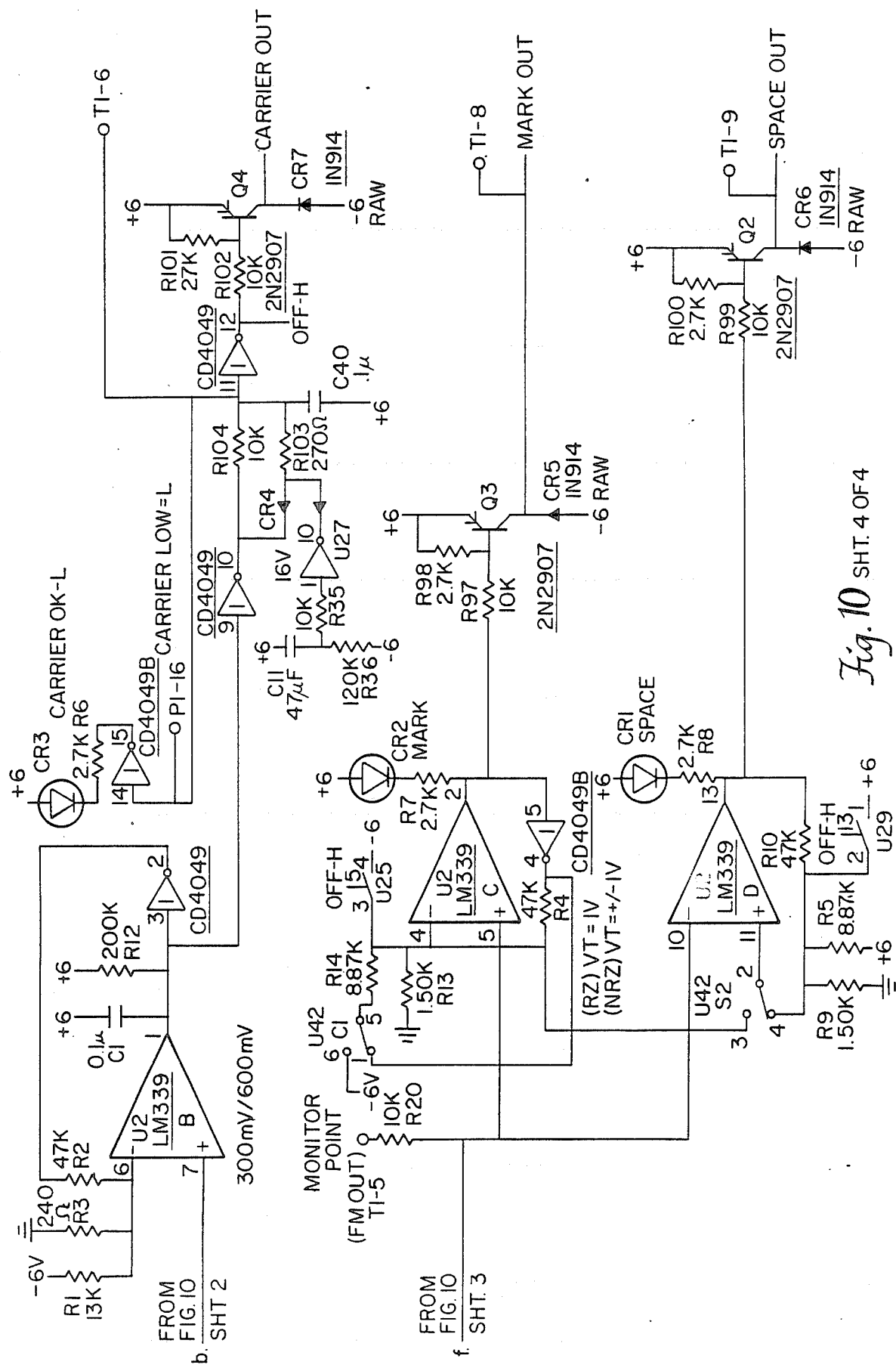
Fig. 10 SHT. 4 OF 4

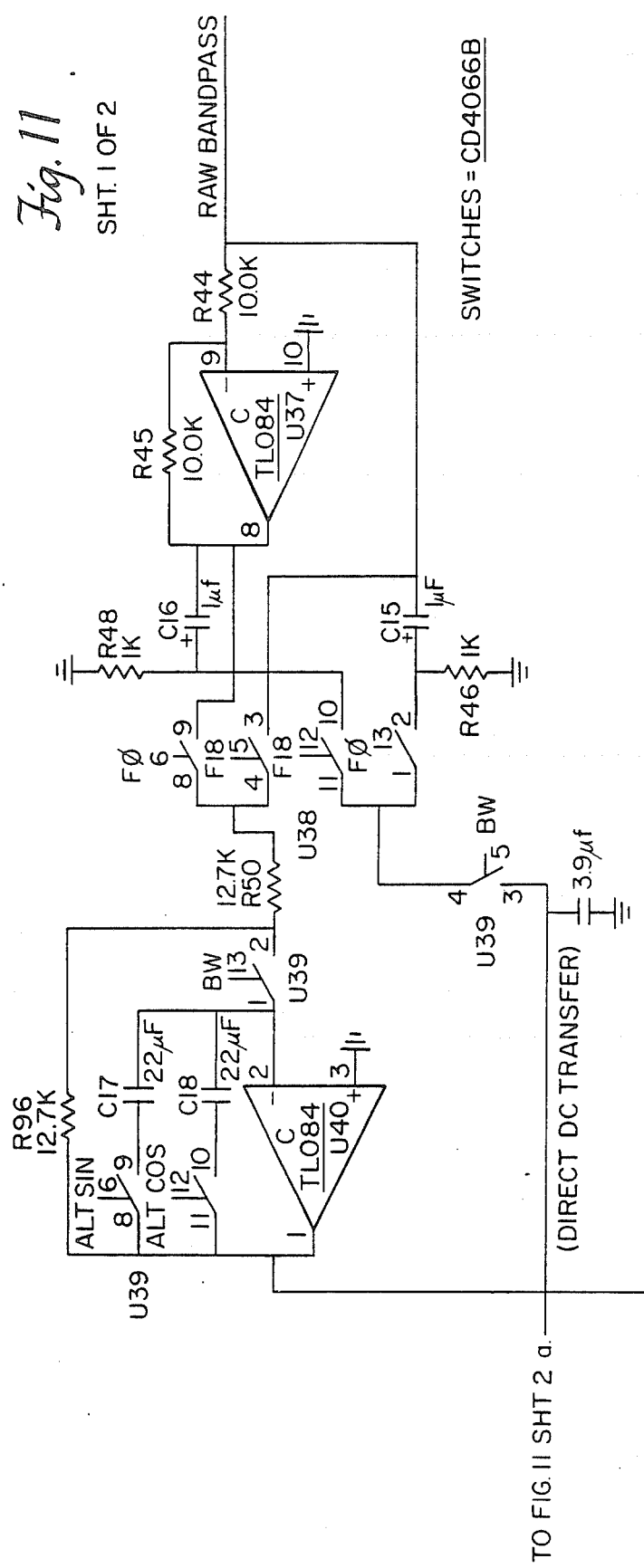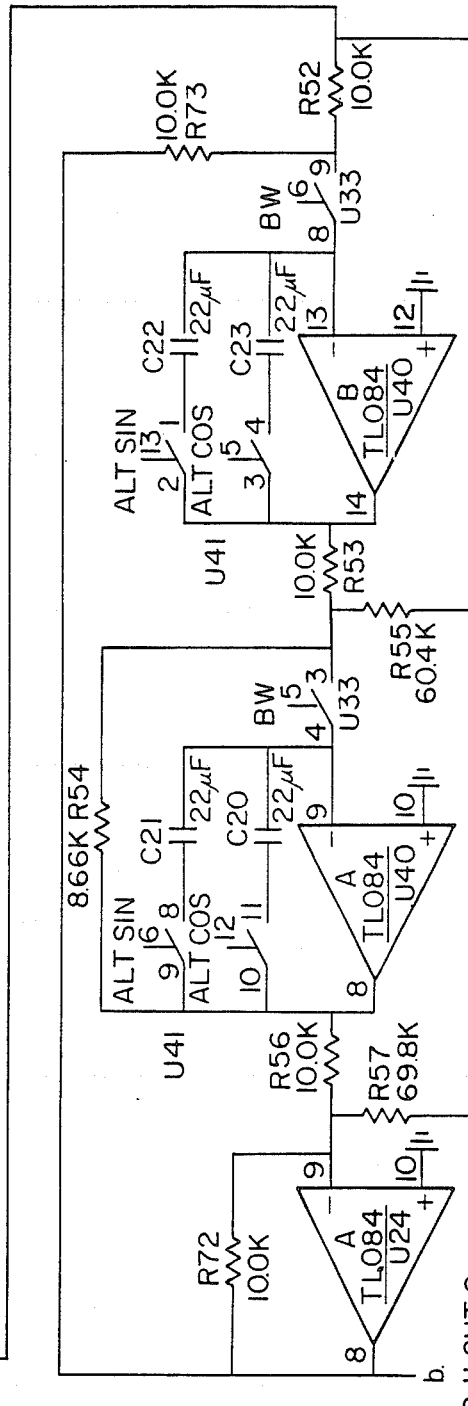
Fig. 11
SHT. 1 OF 2

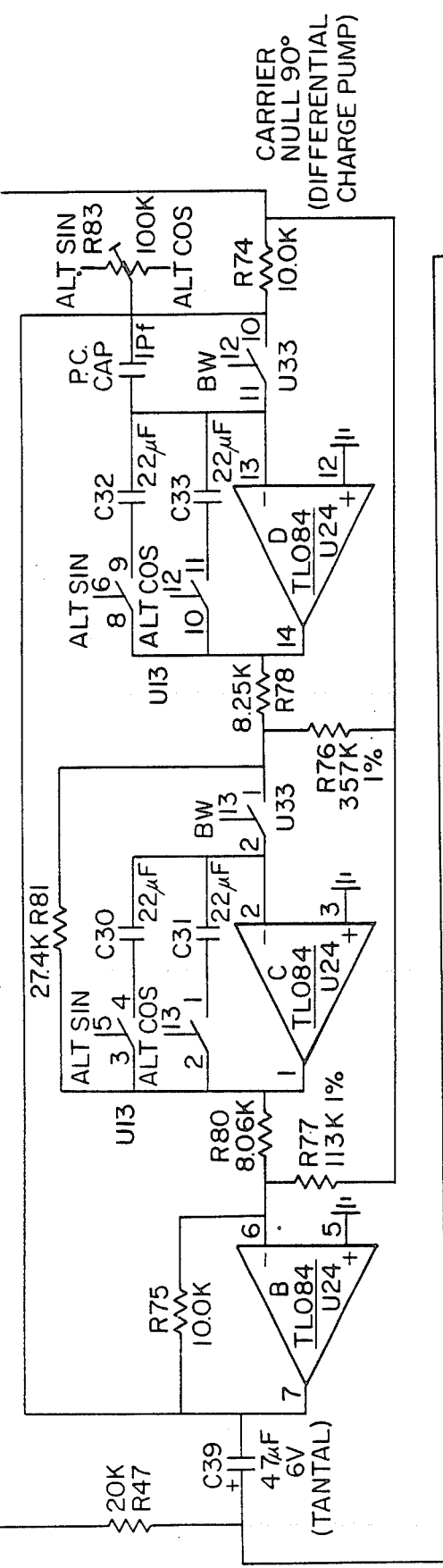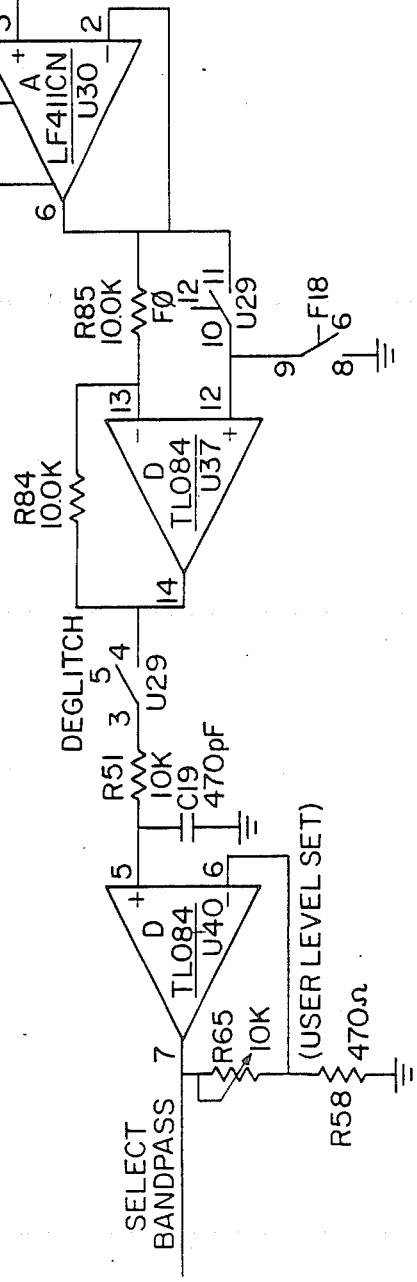
Fig. 11
SHEET 2 OF 2

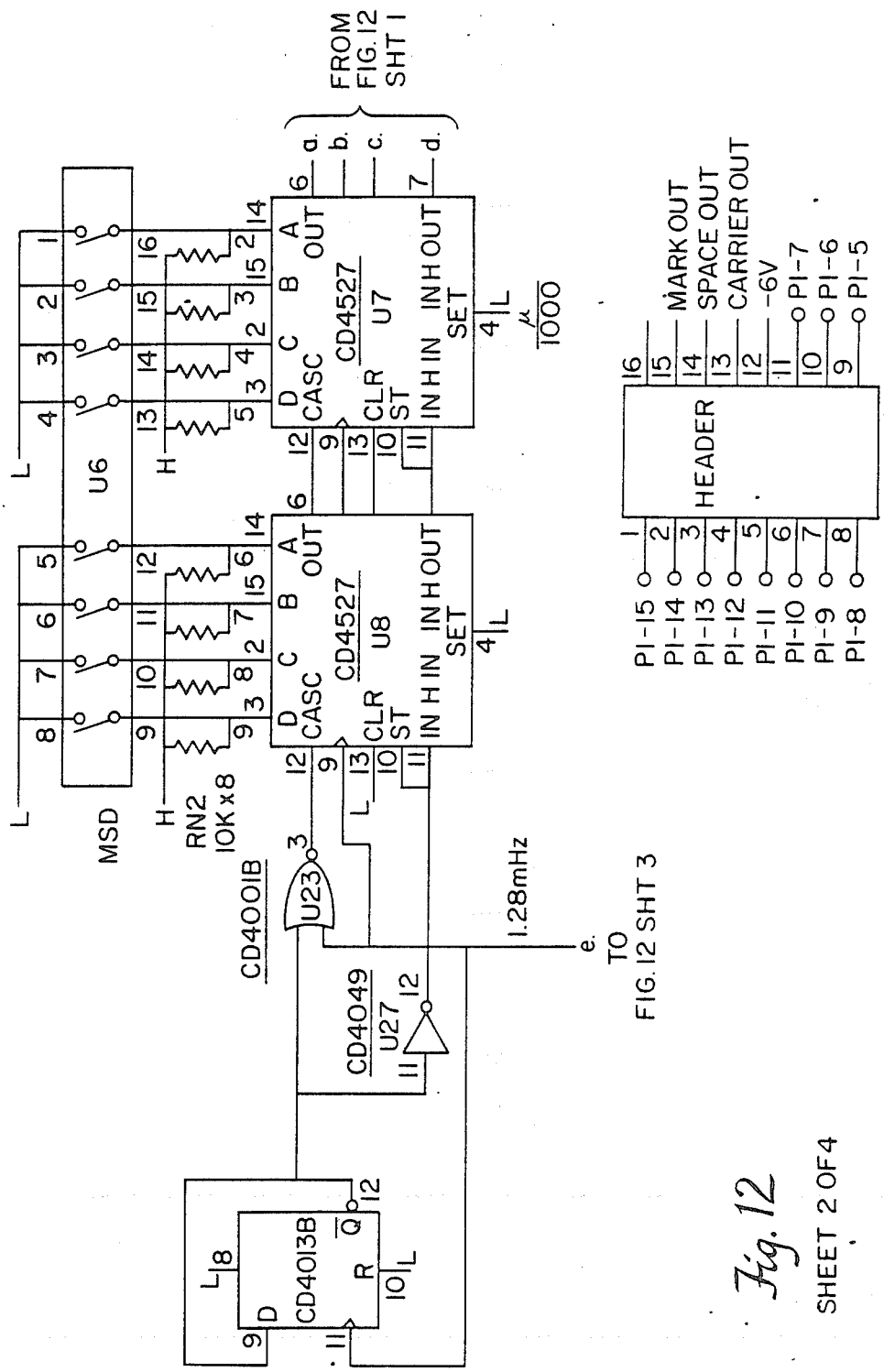

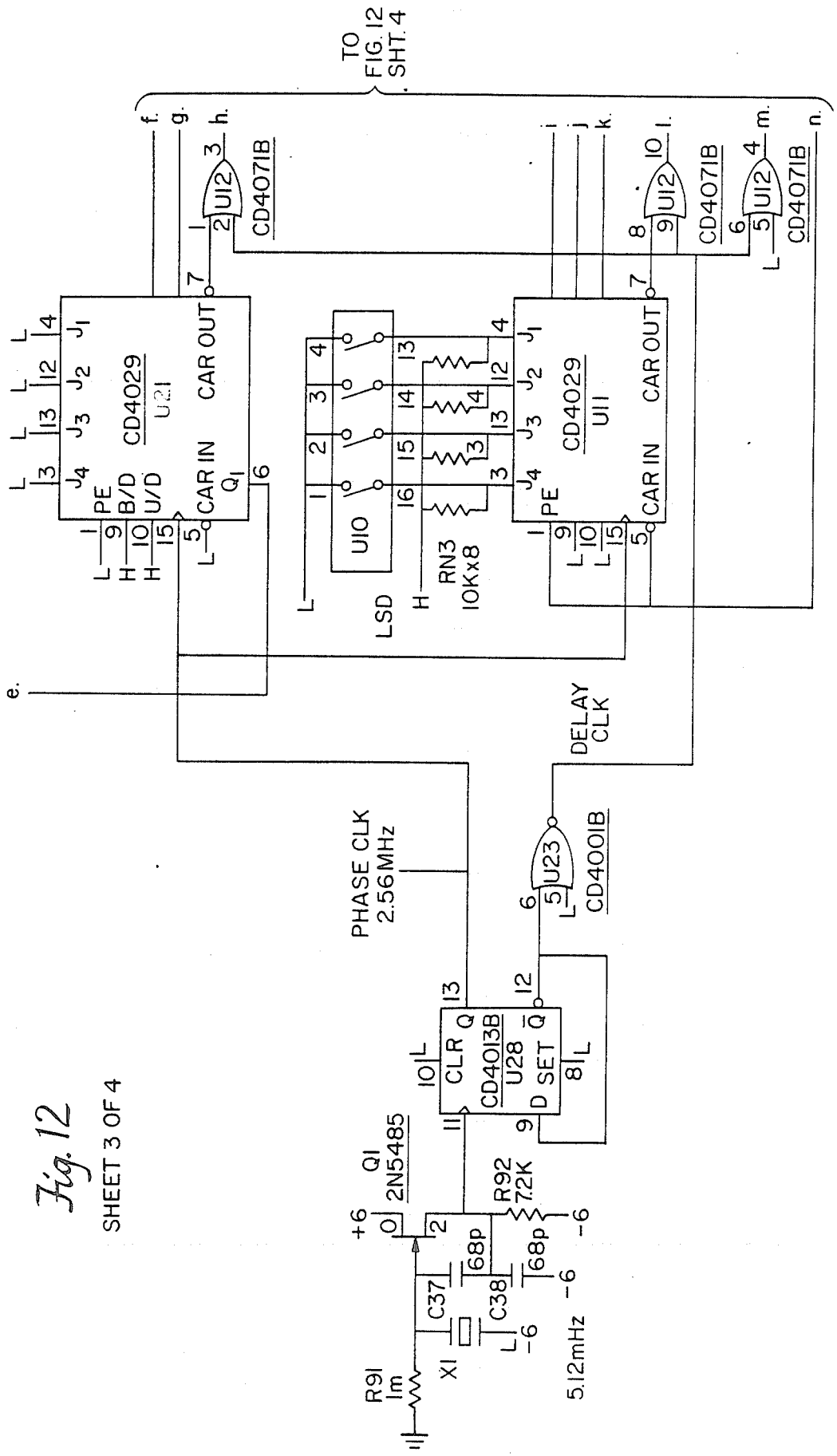

DIGITAL DATA COMMUNICATING

The present invention relates in general to digital data communicating and more particularly concerns novel apparatus and techniques for using a single communications channel, such as a telephone line, to exchange messages substantially simultaneously with a number of stations along the channel. The invention provides the especially advantageous techniques in connection with providing a number of closely spaced very narrow band channels that may operate substantially simultaneously.

A wide range of modems are available for exchanging digital signals with a telephone line or other communication channel.

A preliminary novelty search of subclasses 69.1 and 70 of class 370, subclasses 82, 88 and 122 of class 375 and subclass 213 of class 455 uncovered U.S. Pat. Nos. 3,925,614, 4,044,202, 4,304,004, 4,380,081, 4,475,219, 4,510,453 and 4,527,277, European Pat. No. 93819, German Offenlegungschrifts Nos. 25 30 725 and 25 58 402 and USSR patent document No. 985 956.

It is an important object of the invention to provide improved methods and means for communicating digital data.

According to the invention, there is transmitting means comprising means for providing a modulated signal representative of digital signals, such as mark and space frequencies in a frequency shift keying system or other suitable phase, frequency or amplitude modulation system, or combinations thereof. The latter signals are coupled to bandpass filtering means of controllable bandwidth to provide a signal that is applied to a signal input of an output mixing means. The output mixing means provides the digital information on a carrier frequency signal of selected frequency to provide a digitally modulated output signal that is applied preferably through lowpass filtering means for selectively transmitting information signals to the communication channel, such as a telephone line. A receiver comprises input mixing means energized by a local oscillator signal of selected frequency for selecting a particular carrier for demodulation and modulated carrier signals from the channel, preferably through low pass filtering means. The input mixing means provides a demodulated signal to bandpass filtering means of selected bandwidth for selectively transmitting a selected modulated carrier that is applied to digital data demodulating means, such as an FSK demodulator, for providing mark and space signals representative of the digital information modulated on the carrier thus selectively transmitted.

The bandpass filtering means is preferably programmable and preferably comprises first and second lowpass filtering means each intercoupling a pair of mixing means energized by local oscillator signals of the same frequency; however, the local oscillator signals in the first channel are in phase quadrature with those in the second channel. The signal to be filtered is applied to the first mixing means in each channel and the output signals of the second mixing means are combined to provide the filtered output signal.

According to an aspect of the invention the bandwidth is controlled by electronically controlling the bandwidth of the lowpass filters, preferably by controlling the time allowed for current to flow in a capacitor comprising the lowpass filter typically embodied in a controlled integrator comprising an operational amplifier with a capacitor feeding back the output to the ungrounded input in series with a resistor coupled to the filter input by an electronically controlled switch. According to a feature of the invention the integrator may be time shared by having a plurality of series combinations of switch and integrating capacitor in the feedback loop. Typically there is an in-phase capacitor in series with an in-phase switch shunted by a quadrature capacitor in series with a quadrature switch with the in-phase and quadrature switches closed during mutually exclusive time intervals.

According to another feature of the invention there is D.C. feedforward means around the lowpass filter for reducing D.C. errors.

According to another feature of the invention the reference signals are digitally generated using quantized sinewaves having only two finite positive levels and two finite negative levels.

Numerous other features, objects and advantages of the invention will become apparent from the following specification when read in connection with the accompanying drawings in which:

FIG. 4 is a combined block-schematic circuit diagram of a preferred controlled integrator according to the invention;

FIG. 5 is a combined block-schematic circuit diagram of a time-shared dual integrator according to the invention;

FIG. 6 is a combined block-schematic circuit diagram showing D.C. feedforward according to the invention;

Figure 7:
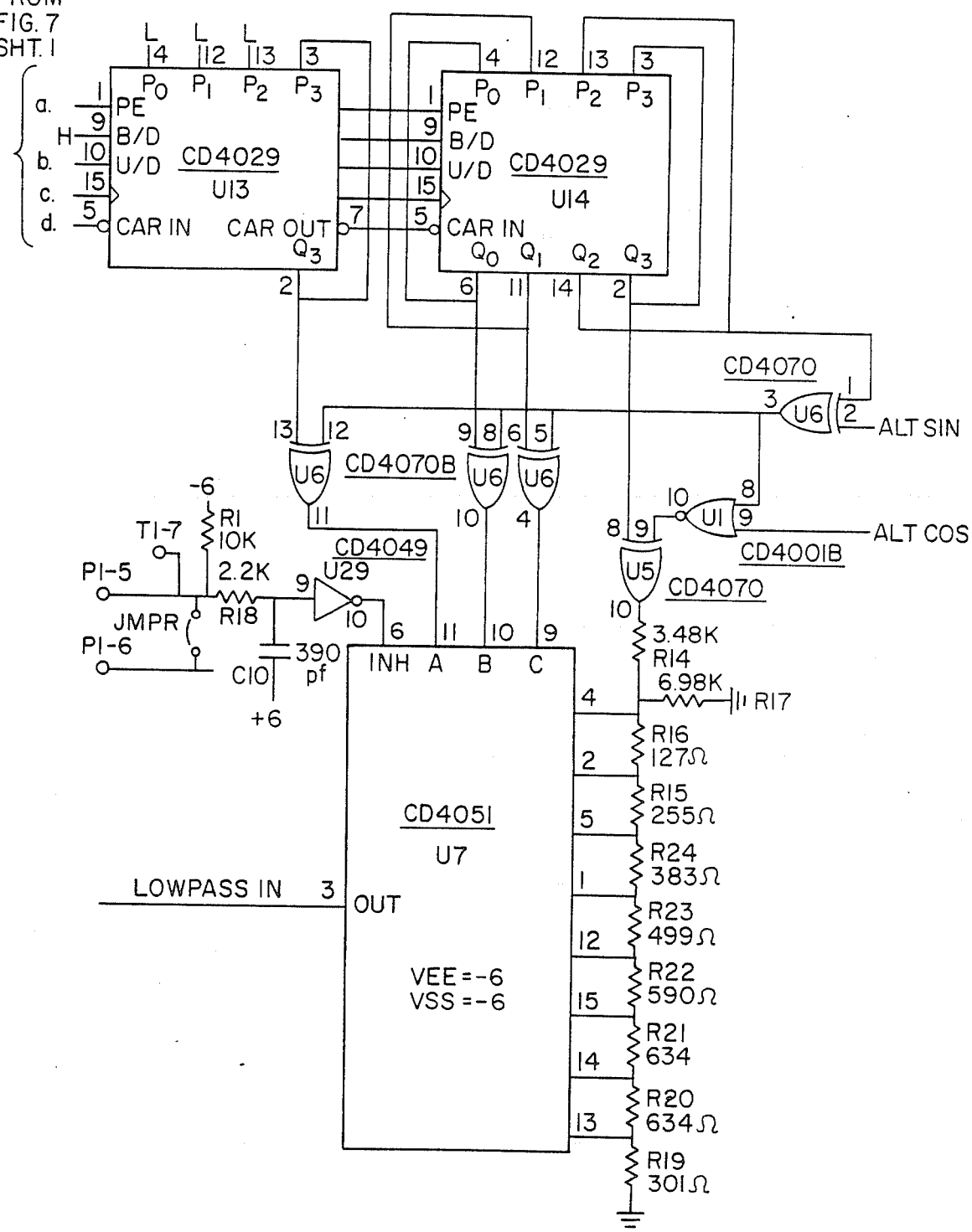
Figure 9:
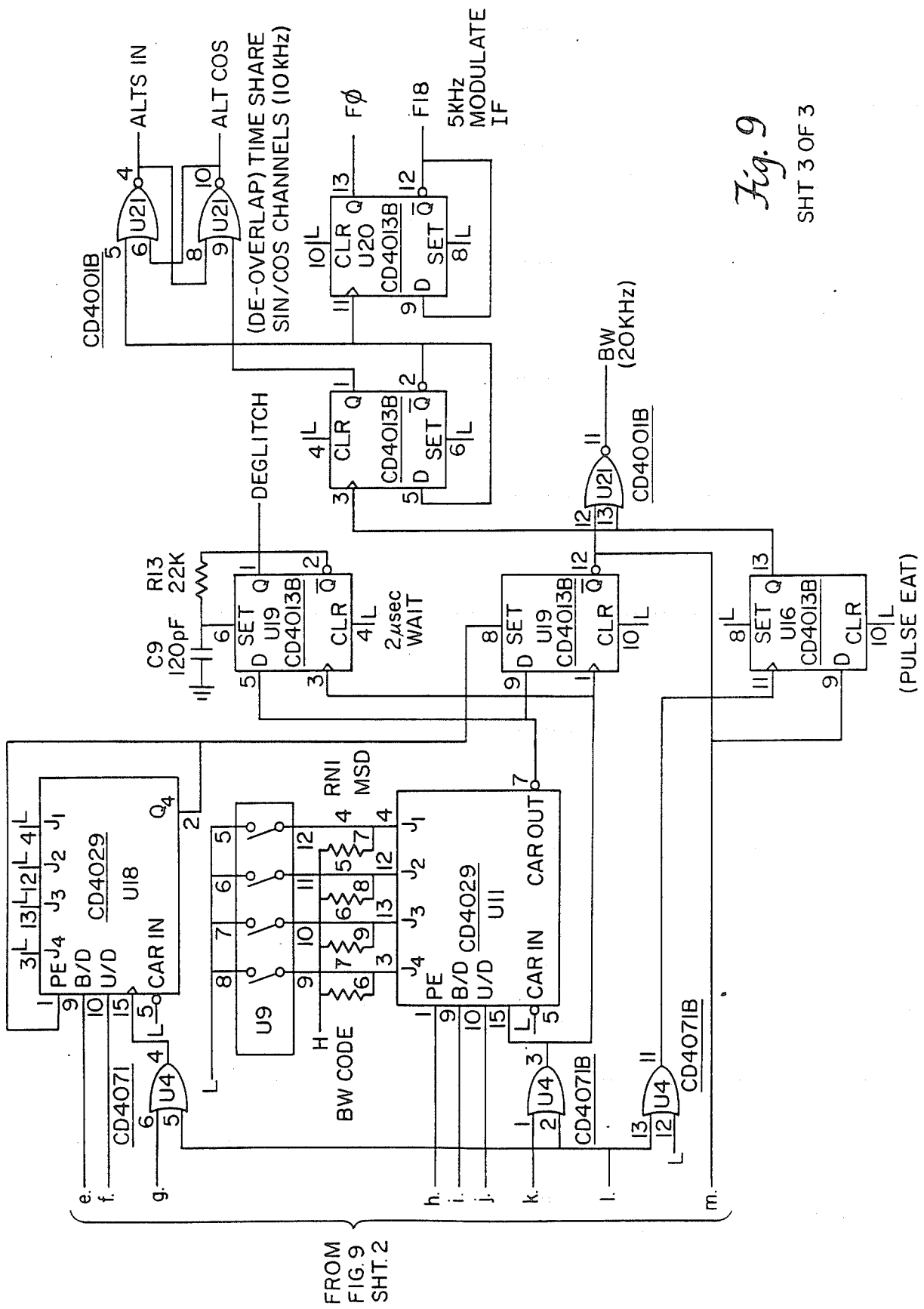
Figure 10A:
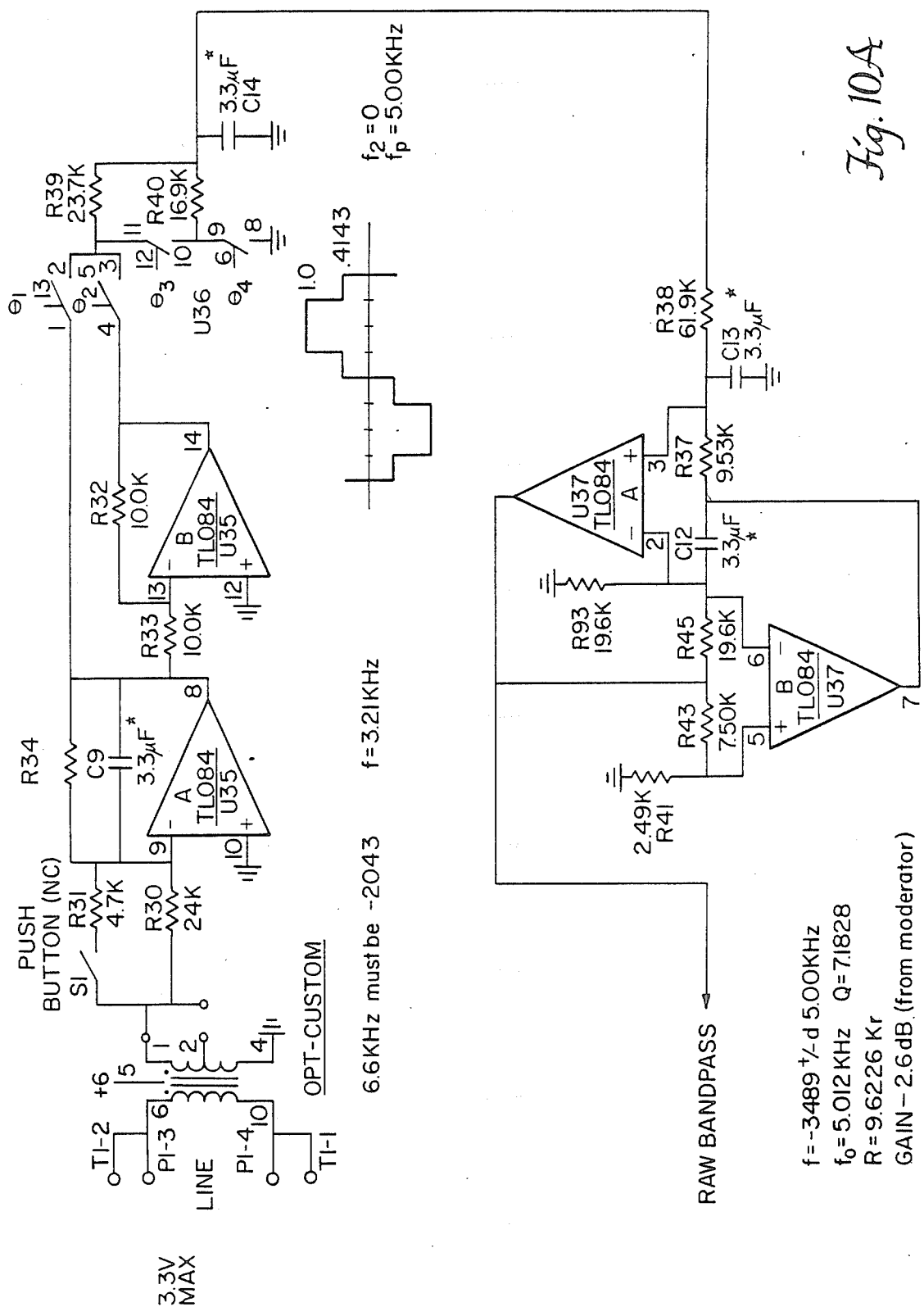
Figures 12A, 12B, 12C, 12D:
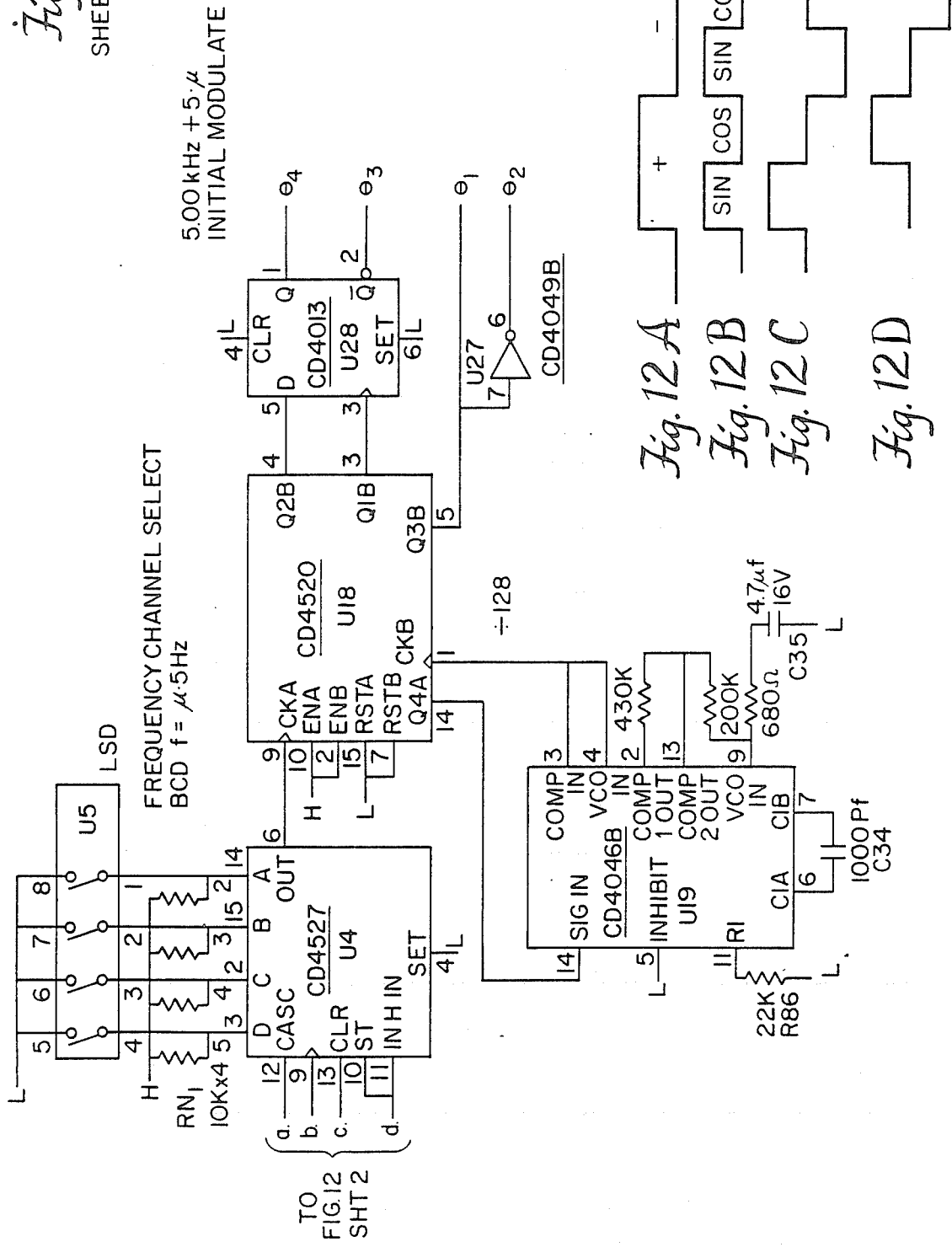
Figure 12:
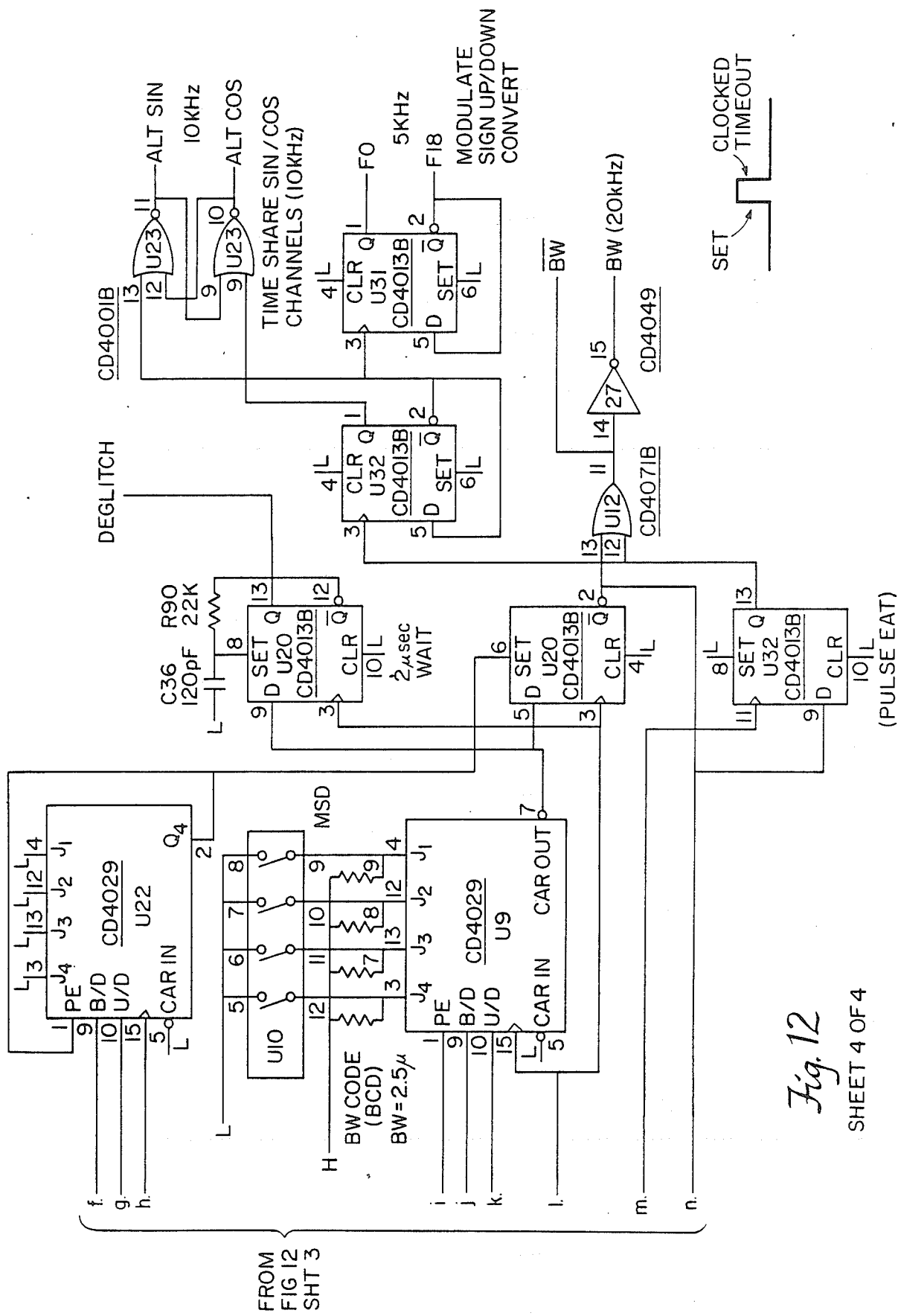

FIGS. 7A-B is graphical representation showing equivalent 5 kHz modulation signals for sine and cosine plotted to a common time scale according to the invention;

FIGS. 7-9 are schematic circuit diagrams of an exemplary embodiment of a transmitter;

FIG. 10A is a graphical representation of a hybrid waveform useful in the invention;

FIGS. 10-12 are schematic circuit diagrams of an exemplary embodiment of a receiver; and FIGS. 12A-12D are graphical representations of signal waveforms to a common time scale helpful in understanding principles of the invention.

Figure 1:
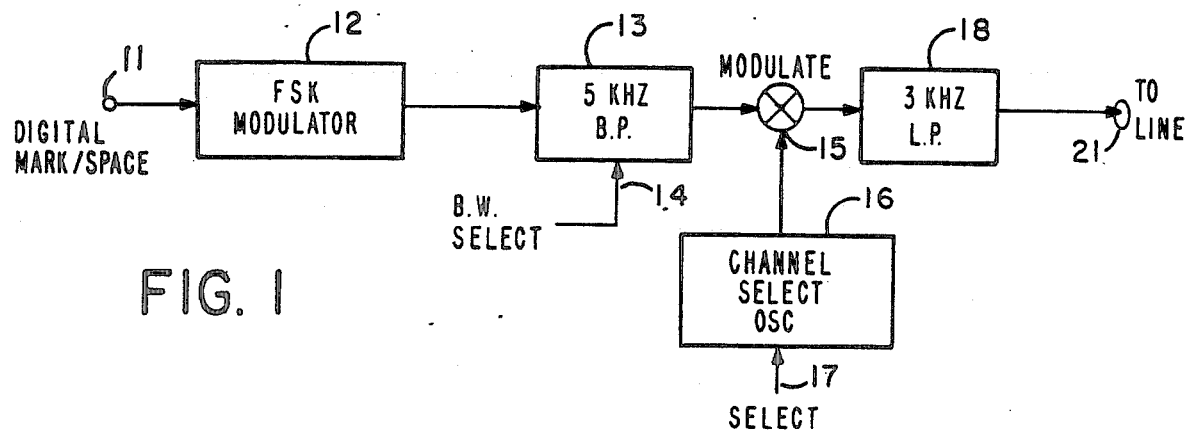
FIG. 1 is a block diagram illustrating the logical arrangement of a transmitter according to the invention.

With reference now to the drawing and more particularly to FIG. 1 thereof, there is shown a block diagram illustrating the logical arrangement of a transmitter according to the invention. The invention concerns digital communication systems in which there are multiple transmitters and multiple receivers distributed along a given telephone line or other communications channel. Each transmitter is matched with a receiver. Each transmit-receive pair is independent of every other and need not be in a central location by taking advantage of frequency division multiplexing.

A feature of the invention is that each pair may be allocated a bandwidth different from the others commensurate with a desired bit rate to be transmitted. The bandwidth is at least the baud rate of the channel. Preferably, there is a guard band between adjacent channels. The invention is especially useful in low bandwidth systems, such as for transmitting information to and from indicators, motors and other devices which usefully exchange information at low data rates. The low data rate facilitates using a single telephone line to accommodate a large number of channels. Preferably, the invention uses frequency shift keying for modulation; that is, one frequency is used for a MARK and one for a SPACE (typically digital ONE and ZERO respectively).

With specific reference to FIG. 1, a digital mark/space signal, such as from a keyboard or other suitable source of a digital signal, is applied to input terminal 11 of FSK modulator 12 to modulate a nominally 5 kHz carrier signal between mark and space frequencies, for example, +25 Hz and −25 Hz, respectively, from the center frequency of 5 kHz. This modulated signal is applied to 5 kHz bandpass filter 13 that receives a bandwidth select signal on line 14 that controls the bandwidth of bandpass filter 13. This filter signal is applied to one input of output mixer 15. The other input of output mixer 15 receives a local oscillator signal from channel select oscillator 16 of frequency controlled by a signal on select input 17 to provide a difference frequency signal that is applied to low-pass filter 18 having a cutoff of substantially 3 kHz to provide a modulated carrier signal on line 21 of frequency corresponding to that which the associated remote receiver is tuned to receive for transmission on a telephone line.

Figure 2:
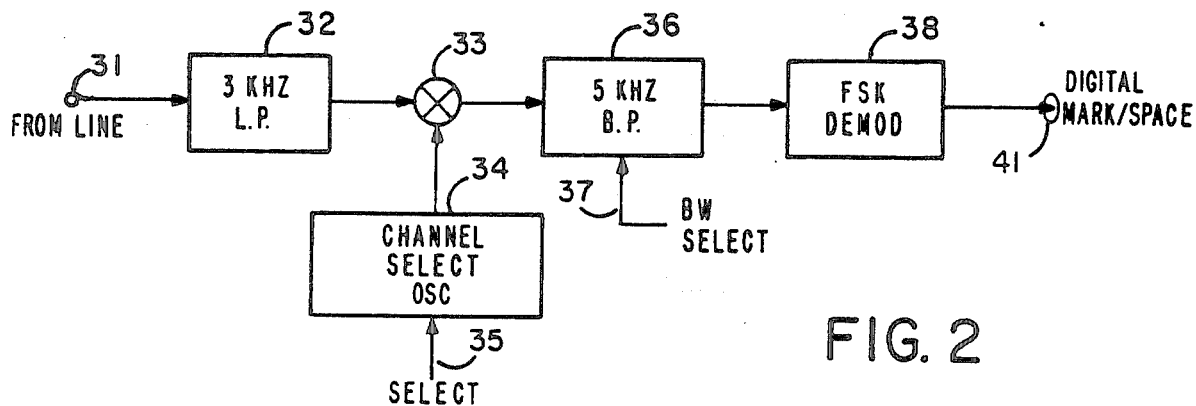
FIG. 2 is a block diagram illustrating the logical arrangement of a receiver according to the invention.

Referring to FIG. 2, there is shown a block diagram illustrating the logical arrangement of a receiver according to the invention. A signal on input terminal 31 of lowpass filter 32, typically having a cutoff frequency of 3 kHz, provides the filtered signal from the telephone line to a signal input of input mixer 33 energized on its local oscillator input with a local oscillator signal from channel select oscillator 34 of frequency determined by the select signal on select input 35 to provide an intermediate frequency signal centered about 5 kHz to 5 KHz bandpass filter 36 of bandwidth determined by a bandwidth select signal provided on bandwidth select input 37. Bandpass filter 36 provides a signal on its output to FSK demodulator 38 that provides mark and space signals on output terminal 41 corresponding to the digital mark and space signals that were provided on input terminal 11 in FIG. 1 of the associated transmitter. For a particular channel, the bandwidth select signals on terminals 14 and 37 select the same bandwidth, and the channel select signals on terminals 17 and 35 select a local oscillator signal of the same frequency.

The invention solves a number of problems. The invention provides stable narrow band filters for separating a relatively large number of narrow channels.

The problems solved by the invention will be better appreciated from the following example. Consider a 50 baud channel having a bandwidth of ±25 Hz from a nominal center frequency of 3 kHz. This channel requires a filter having a bandwidth of less than 2% of the center frequency (50/3000). The filter must be relatively sharp and hence high order, presenting a problem of creating a filter having a Q of 100 with high stability. Although a passive filter could be built with precision components, it would be costly, and a passive filter must be built for each center frequency and each bandwidth for both the receiver and transmitter.

The present invention provides a common filtering system that is field selectable for any bandwidth and any center frequency. Furthermore, the extremely narrow filter pass bands are extremely stable. The selected bandwidth may be as little as 0.5 Hz. The invention provides programmable narrow band filtering with selectable center frequency and bandwidth.

Although bandpass filters 13 in the transmitter of FIG. 1 and 36 in the receiver of FIG. 2 may be physically the same, they perform somewhat different functions. Receiver bandpass filter 36 rejects all unwanted channels and passes only the selected channel associated with that receiver. Transmitter bandpass filter 13 rejects all spectral components created by the modulation process which would be outside the band of the associated channel and in the band of another channel.

The invention provides programmable narrow band filtering with selectable center frequency and bandwidth.

Figure 3:
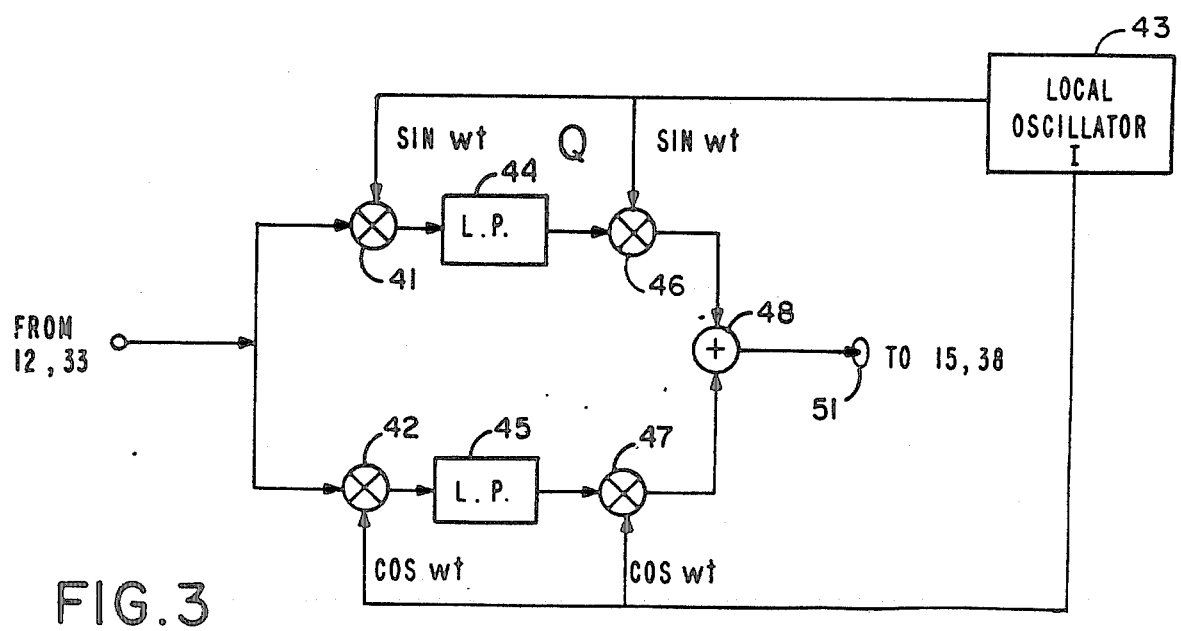
FIG. 3 is a block diagram illustrating the logical arrangement of a preferred form of bandpass filter according to the invention.

Referring to FIG. 3, there is shown a block diagram illustrating the logical arrangement of a preferred form of transmitter bandpass filters 13 and receiver bandpass filters 36. This embodiment of the bandpass filter effectively translates the spectral components centered about 5 kHz to a center frequency of 0 Hz and then retranslates the information after filtering around 0 Hz back to 5 kHz. The spectrum translated about a center frequency of 0 Hz is applied to a lowpass filter having a cutoff frequency sufficient to transmit the spectral components of interest for the associated channel. A characteristic of this approach is that both translated mark and space frequencies will appear at 25 Hz and would appear to be indistinguishable. However, they are separated with the system of FIG. 3 by effectively performing complex arithmetical manipulation in the down and up modulations in forming real and imaginary representations by using quadrature components of local oscillator signals in two parallel channels to perform what may be referred to as I (inphase) and Q (quadrature phase) modulation.

Thus, the signal from an associated modulator, such as FSK modulator 12 in FIG. 1 or mixer 33 in FIG. 2, energizes both input mixer 41 in the quadrature channel designated Q and mixer 42 in the inphase channel designated I. The local oscillator inputs of mixers 41 and 42 are energized by Q and I outputs of local oscillator 43 that provide a 5 kHz local oscillator signal in phase quadrature at the Q and I outputs that may be regarded as sine and cosine signals, respectively, of the local oscillator signal. The difference frequency signals provided by mixers 41 and 42 are delivered to the inputs of Q and I low-pass filters 44 and 45, respectively, having the desired bandwidth. The outputs of low-pass filters 44 and 45 are coupled to signal inputs of output mixers 46 and 47, respectively. The local oscillator inputs of mixers 46 and 47 receive local oscillator signals in phase quadrature from the Q and I outputs, respectively, of local oscillator 43. The outputs of mixers 46 and 47 are cumulatively combined by adder 48 to provide a filtered signal on output terminal 51. The output signal on terminal 51 is coupled to the signal input of mixer 15 in the transmitter of FIG. 1 and to the input of FSK demodulator 38 in the receiver of FIG. 2.

Low-pass filters 44 and 45 may take a wide variety of forms and may have a wide variety of transfer characteristics. It is preferred that elliptic techniques be used for sharp cutoff where desired and gaussian techniques for good intersymbol separation. The low-pass filters 44 and 45 for a particular channel are preferably matched. That is to say, the amplitude and phase characteristics of their transfer functions should be substantially the same.

Referring to FIG. 4, there is shown a combined block-schematic circuit diagram of a suitable form for a base integrator active filter circuit comprising low-pass filters 44 and 45 that allows effective control of the filter bandwidth. Input terminal 61 is coupled by switch 62 and resistor 63 of value R to the ungrounded − input of differential amplifier 64. The + input of differential amplifier 64 is grounded. Capacitor 65 of value C couples the output of amplifier 64 to its ungrounded − input to form an integrator. Output terminal 66 is coupled to a signal input of mixers 46 or 47 in the filter of FIG. 3.

The bandwidth of a filter may be varied with a switch changing the value of components. In a preferred form of bandwidth control according to the invention, the bandwidth may be continuously programmable with direct electronic control of the effective value of a resistor change by electronically conktrolling the percentage of time the resistor is allowed to conduct current. All filters may be regarded as containing energy storage elements, such as capacitors and inductors. In a preferred form of low-pass filter according to the invention, the active filter uses only capacitors for energy storage elements in cooperation with resistors and operational amplifiers.

The change in voltage across a capacitor is a function of the current into the capacitor divided by its capacity. To change the bandwidth or cutoff frequency of the filter of FIG. 4, the capacitor and/or resistor values may be changed. However, according to the preferred form of the invention, nonlinear techniques may be used to control the effective filter bandwidth by controlling the time allowed for current to flow.

By using a filter circuit structure which has only capacitors and by selecting a substructure with those capacitors in an integrator configuration, the value of the capacitors uniquely determines the bandwidth if all capacitors are scaled by the same factor. Since the resistor value of the integrator always appears with the capacitor value, we can scale either the R or C by scaling the percentage of on time. FIG. 4 just illustrates one form of this scaling. Any structure with just capacitors (active filter with operational amplifiers and no inductors) will be bandwidth scalable by electronically controlling the percentage of time for current flow in the capacitor. The integrator structure of the state variable type allows that switching function to be placed in series with the resistor; other structures require the switch to be placed elsewhere, e.g. in series with the capacitor.

If switch 62 is closed continuously, the circuit will function as a conventional integrator having a time constant of RC and amplitude frequency response of 1/RCf. In the time domain, the step response is a ramp having a slope proportional to 1/RC. By opening and closing switch 62 at a rate that is high compared with the spectral components being filtered, the effective bandwidth of the filter of FIG. 4 may be varied in accordance with the duty cycle. For example, if the switching rate has a 50% duty cycle, the step response has a slope half that as with switch 62 continuously closed. The exact actual response is a staircase with many tiny steps at switch frequency, typically 20–50 kHz; however, the spectral components producing these effects are readily rejected in later processing to cause no practical effect. The effect of switching at 50% duty cycle compared to switch 62 being continuously closed (100%) duty cycle is to provide a filter having the properties of one with switch 62 continuously closed and a capacitor 65 twice as large as C. By programming the duty cycle of switch 62, the effective value of capacitor 65, and, hence, the effective bandwidth of the filter may be controlled.

For a practical application, low-pass filters 44 and 45 may be embodied with a number of the integrator stages shown in FIG. 4, each stage having a corresponding switch 62. The user may program the duty cycle of the switch to control bandwidth. In a typical application, the digital switch system may have 100 user-selectable duty cycles to provide selectable bandwidths over a 100:1 range. Generally, each low-pass filter, such as 44 and 45, comprise multiple second order sections in the state-variable configuration of FIG. 4. Those skilled in the art may determine actual component values and circuit structure using known techniques for the design of active filters. The order of the filter may be as small as two for the transmitter of FIG. 1 and as high as eight or ten for the receiver of FIG. 2. Switches, such as 62, are preferably electronic switches of a type well-known in the art.

Referring to FIG. 5, there is shown a combined block-schematic circuit diagram of a time-shared dual integrator according to the invention which may be used as an integrator in the implementation of low-pass filters 44 and 45 in the system of FIG. 3. This circuit is the same as the circuit of FIG. 4 except that capacitor 65 is replaced by the parallel combinations of capacitor 67 of value $C_I$ in series with switch 71 and capacitor 68 of value $C_Q$ in series with switch 72. By changing the programmable on-time for switch 62 from between 0 and 100% to a range of 0 to 50%, no currents flow in any capacitor for the 50% off portion of the duty cycle. During this dead time, switches 71 and 72 may be operated to remove one of capacitor 67 and 68 and substitute the other in the circuit. By assigning each of the two capacitors a duty cycle of 0 to 50% we allow for both to be operating without interference. The transition between the two sets of capacitors is done at the instantaneous 50% and 100% points in the cycle. With regard to a single capacitor which is assigned the 0 to 50% slot, it is off in the 50 to 100% slot; the capacitor assigned to the 50 to 100% slot is off in the 0 to 50% slot. This mode of operation will be better understood from the following discussion.

It is convenient to assume that switching waveforms $S_I$ and $S_Q$ for operating switches 71 and 72 are digital square waves at a frequency of 10 kHz, twice the nominal center frequency, having a period of 100 microseconds. For the first 50 microseconds the I channel is active and for the next 50 microseconds the Q channel is active. To operate a 10:1 bandwidth reduction, switch 62 is closed from 0 to 5 microseconds (10% of the 50 microseconds) and again from 50 to 55 microseconds (10% of the other 50 microseconds).

The circuit of FIG. 5 is repeated in all of the filters embodying the system of FIG. 3. This circuitry in effect is a sample data filter generally thought to be only a digital filter, but here implemented in an analog structure.

This aspect of the invention has a number of advantages. Common amplifiers, resistors and bandwidth switches are all used in both low pass filters 44·and 45; therefore, matching the two filters only involves matching the pairs of capacitors 67 and 68 and the pairs of activation switches 71 and 72. Not only are the number of parts and cost significantly reduced, but system performance is improved by the free matching automatically implemented by the use of common elements.

A poor matching may generate spurious spectral components at the filter output not present in the original signal that could seriously degrade performance. Preferably, these components are at least 20 dB below the desired signal components, and this degree of attenuation is readily achieved using 2% capacitors for capacitors 67 and 68.

Referring to FIG. 6, there is shown a combined block-schematic circuit diagram illustrating a preferred technique for avoiding the creation of spurious carriers by using D.C. feedforward. The output terminal 65 of a low-pass filter, such as 44, 45 is coupled by coupling capacitor 81 to output terminal 82. Feedforward resistor 83 intercouples input terminal 61 and output terminal 82. The feed forward path through resistor 83 is effectively an ultra-low-pass filter formed by resistor 83 and capacitor 81 having no D.C. error because there are no active components. The main path through low pass filters 44, 45 is now a pseudo bandpass filter having a transfer characteristic complementary to that of the ultra-low-pass filter formed by resistor 83 and capacitor 65; that is to say, the cutoff frequency of the ultra-low-pass filter is the same as the low frequency cutoff of the pseudo bandpass filter with the slope in the transition regions being of the same magnitude and opposite sense.

Referring to FIGS. 8 and 9 there are shown schematic circuit diagrams with actual component values of a specific embodiment of the transmitter of FIG. 1. FIG. 7 is a schematic circuit diagram of the modulator base band, FIG. 8 is a schematic circuit diagram of the transmitter analog filter, modulator and output, and FIG. 9 is a schematic circuit diagram of the clock generator.

Referring to FIGS. 10, 11 and 12, there are shown schematic circuit diagrams with actual component values of an exemplary embodiment of the receiver of FIG. 2. FIG. 10 is a schematic circuit diagram of the front end and phase demodulator; FIG. 11 is a schematic circuit diagram of the base band filter; and FIG. 12 is a schematic circuit diagram of the clock generator. Since those skilled in the art will be able to build an actual working embodiment of the invention by interconnecting the components as shown, these schematic circuit diagrams will only be discussed briefly.

With specific reference to FIG. 10 of the receiver, the signal on input 61 is effectively modulated by the signals designated F0 and F18 indicated as controlling the duty cycle of the electronic switches in electronic switch package U38. F0 and F18 are the two phases (0° and 180°, respectively) of the 5 kHz local carrier reference frequency signal. Although the discussion above made reference to sine and cosine signals in phase quadrature, it is shown below that this function is implicit as embodied in FIG. 11. The modulated signal then feeds the time-shared low-pass filter input stage through resistor R50. This first section is a first order low pass filter having the bandwidth control switch U39 driven by a signal designated BW, a pulse width modulation signal at 20 kHz. The dual set of filter capacitors C17 and C18 are in series with switch sections that are part of electronic switch package U39 driven by signals designated ALTSIN and ALTCOS at a 10 kHz rate in phase quadrature.

For an understanding of this equivalence to sine and cosine demodulators, reference is made to the clock generator schematic circuit diagram shown in FIG. 12 which shows waveforms referred to above in FIGS. 12A-12D. The upper waveform in FIG. 12A designated Fφ is equivalent to multiplication by +1 during the first half-cycle designated + and −1 during the other half-cycle designated −. The signal shown in FIG. 12C which activates the sine capacitor C17 is +1 for the first 90° of the 5 kHz reference carrier signal, off from 90° to 180°, −1 from 180° to 270° and then off from 270° to 360°. Referring to FIG. 7A, the composite waveform is shown. A similar analysis for the COS CAP wave shown in FIG. 12D in combination with the Fφ wave provides the composite waveform shown in FIG. 7B. As can be seen the two square waves and their fundamentals are in phase quadrature.

The bandwidth control signal is designated BW and its complement BW. The DEGLITCH signal disconnects the filter during the switchover to prevent spurious output signals.

Remodulation occurs in the circuitry comprising operational amplifier U37 operating in substantially the same manner as described above in connection with developing the waveforms of FIGS. 7A and 7B. The filter embodies the time sharing features of FIG. 5. The time sequence is cosine, sine, cosine and sine for each period of four 50 microsecond intervals. The +1/−1 square wave multiplies the first two time slots by +1 and the second two by −1. This is equivalent to having multiplied the cosine part by cosine and the sine part by sine. The two time shared parts remain as a composite because the final steps comprises an addition and smoothing. The addition of the two filters outputs thus occurs in the small time slots with smoothing following in a conventional 5 KHz bandpass filter shown in FIG. 11.

The DEGLITCH signal applied to terminal 5 of switching package U39 is typically a conventional sample and hold signal which keeps the associated switch open during the transition region when the filter switches between the two states. Resistor R47 functions as feedforward resistor. In addition, there is pseudo D.C. which is equivalent to a positive D.C. error in the cosine part and the corresponding D.C. error in the sine wave part that will be observed as a simple square wave and is removed by adjusting potentiometer R83. The origin of this pseudo error is in small differential D.C. differences in the sets of switches. Potentiometer R94 connected to operational amplifier U30 may be used to balance out any residual D.C. error at its input, typically this residual error being about 0.5 mv.

Referring to FIG. 8, there is shown the similar transmitter filter that contains only two sections. The input does not contain the implicit 5 kHz down modulator because the initial FSK input is generated around 0 Hz instead of around 5 kHz and is shown in FIG. 7 as integrated circuit U7 and is described below in greater detail. The output of the transmitter filter includes the 5 kHz remodulator comprising switches A7 with no D.C. feedforward in this section because the signals are at high level.

As explained above channel selection to convert the signals for a particular channel to the 5 kHz transmitter and receiver internal 5 kHz channel is accomplished with a modulator or mixer driven by a frequency selectable local oscillator. Acceptable approaches may be a square wave modulator having two stages implemented by switches or a sine wave linear modulator. The former provides relatively good performance at low cost but requires additional filters to reject unwanted harmonics of the square wave.

The preferred form according to the invention uses a hybrid structure that is between a square wave modulator implemented with switches and a sine wave linear modulator. This is accomplished by creating a four level approximation to the sine wave instead of the two level square wave. This waveform is shown in FIG. 10A. The switches comprising switch package U36 create this waveform. The set of switches controlled on electrodes 13 and 5 select the sign of the multiplication $\theta_1-\theta_2$, and the set of switches controlled on electrodes 6 and 12 selects the gain of the result $\theta_3-\theta_4$. An advantage of this waveform is that there are no spurious components at either the third or fifth harmonic. The first component is at the seventh harmonic, which is relatively easy to filter. The result is that adding a relatively inexpensive and high performance set of additional switches creates a greatly reduced filter requirement embodied in a resulting simple bandpass filter. This approach is also used in the final modulator of the transmitter.

Conventional FSK signal sources may be used with the invention. Typically these sources use a signal-controlled oscillator or means for selectively transmitting a signal from one of two oscillators of fixed frequency. According to a preferred form of the invention, the FSK signal is created in the complex frequency domain at real frequencies just above D.C. An advantage of this approach is that the bandpass filter of the invention will operate on these complex signals without demodulation of signals on a carrier as indicated above. Furthermore, the complex frequency domain facilitates providing a simple and well controlled set of frequencies.

This approach involves separating sine $\theta$ or cos $\theta$ from $\theta$ itself. There is a unique mapping from $\theta$ to sine $\theta$ or cosine $\theta$, and this mapping can be deferred until the last stage of the modulation. The mapping is a simple one-to-one mapping.

Using 0 Hz as the center, these principles are implemented by defining a positive frequency shift as corresponding to a linearly increasing $\theta$ and a negative frequency shift as corresponding to a linearly decreasing $\theta$. The magnitude of the frequency shift is proportional to the slope of the decrease or increase.

Referring to FIG. 8, a reference clock signal produced by dividing the 5.12 MHz signal provided by the crystal oscillator comprising transistor Q1 and associated circuit components shown in FIG. 9 divided by eight is delivered to the user programmable dividers comprising U9, U10, U11, U17 and U18 to provide a signal of new frequency on the line designated f640 as a clock signal. This signal goes to the phase counter comprising U8. The mark space commands on the designated terminals change that counter from up to down and vice versa. In certain applications, it may be desirable to have three states in which the third state is a carrier state and corresponds to stopping the counter.

The count in the counter corresponds to the true phase, and this count is converted into a format which may be used for the final mapping to sine and cosine. In this particular implementation, the high two bits are stripped to identify the quadrant, and the lower three bits are used to encode one of eight states in each quadrant. That is, in effect, quantiging the phase into 12.5° increments. This embodiment uses the three bits to drive an 8:1 analog multiplexer which selects one of eight levels corresponding to the sine wave. The quadrant select is used for the sign. The alternation between sine and cosine is easily accomplished by using a simple 90° adder to the quadrant bits. The specific circuitry is shown in FIG. 8. Integrated circuit U7 functions as the 8:1 demultiplexer, and the logical circuitry just above comprises the quadrant selector with the 90° optional adder for converted sine to cosine.

For connecting the invention to a telephone line, it is preferred that the receivers for each channel have a high impedance standard bridging input. For the transmitter it is preferred to use a high impedance current source output stage for driving a current into the telephone line.

While conventional techniques for frequency demodulation of the FSK signal may be employed, such as a frequency discriminator or a pair of filters tuned to mark and space frequencies followed by amplitude detectors, a period detector is preferred for the invention. A period detector effectively measures time intervals, and the local crystal reference in the receiver may be used for this function. The 5 receiver I. F. signal, after bandpass filtering, is limited to provide square waves. These square waves are applied to a counter that is reset on each leading edge and counts an internal high frequency clock between leading edges. The number of counts is proportional to the time interval between edges of the limited I.F. signal. That counter variable in digital form is delivered to a digital-to-analog converter to create an analog signal representative of the period (reciprocal of frequency).

The use of a period demodulator instead of a frequency demodulator produces little error when the frequency deviation is small relative to the 5 kHz internal reference; e.g., 25 Hz deviation from 5 kHz. With larger deviations, this error may or may not be acceptable. There are many ways to correct this slight nonlinearity and still preserve the stability inherent in the use of a period demodulator with a crystal controlled counter as reference. The following example is a way to make the conter method produce an error-free version of frequency. Place an additional electronic switch at the output of the D/A converter and allow this switch to be closed for a fixed time interval following each update of the D/A's register', e.g., a 100 usec on-time controlled by a monostable. This can be shown to correct the error from period demodulation because the number of pulses (switch closings) will now be itself a function of frequency. The 5.025 kHz positive deviation will produce slightly more pulses per second than the negative 4.975 kHz equivalent.

One advantage of this approach is that the invention may provide digital amplification. For example, consider a 25 Hz deviation on a 5 kHz carrier and a 2.56 MHz local oscillator providing cycles being counted by a five-digit counter. At 5 kHz there will be 200 microseconds or 512.00 countsbetween leading edges; at 5.025 kHz there will be 509.45 counts and at 4.975 kHz there will be 514.57 counts. Notice that the upper bits of the counter will always be the same regardless of the signal being either a mark or space. In fact only the three least significant bits need by delivered to the digital-to-analog converter.

A few additional bits may be desirable because of phase distortion introduced by filters and the telephone line. Nevertheless, digital amplification may be used to sense small deviation without using precision components. The invention will also work for extremely small deviations, such as 2.5 Hz.

It is important to provide good symmetrical limiting. Otherwise, offsets may occur caused by failure to slice when the signal is extremely small, and offsets will result in the conversion of unwanted amplitude modulation into equivalent frequency modulation. Symmetrical limiting is achieved in the invention by taking the limiter square wave, and feeding back any deviation from 50% duty cycle. The limited slice is set to be between those limiting values which minimize the deviation from 50% duty cycle because this slice must be the center of the sinusoidal waveform being limited. This limiting is accomplished in an operational amplifier of U2 between pins 8, 9 and 14 with the feedback circuit comprising R16 and capacitor C2 shown in FIG. 10.

Another feature of the invention resides in period normalization. The signal provided by the period demodulator is of amplitude proportional to deviation from center frequency. This result and other advantages are achieved by using the duty-cycle-controlled bandwidth signal applied to control electrode 13 of switch U25 in series with resistor R24. Differential amplifier U35C and associated components comprise a simple lowpass filter. For low bandwidths the effective gain is increased, and the effective bandwidth is decreased proportionally. The result is that the output of differential amplifier U35C is normalized with 3 volts equal to 100% deviation regardless of the actual frequency. This feature allows fixed slice levels to be used in the mark and space comparators comprising differential amplifiers U2C and U2D and associated circuitry in FIG. 10.

There has been described novel apparatus and techniques for digital data communicating. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein described and limited solely by the spirit and scope of the appended claims.

What is claimed is:

1. Digital data communicating apparatus comprising,
    a plurality of transmitting means for providing digital data signals each comprising,
    modulating means for selectively providing first and second binary signals representative of first and second binary values, respectively,
    bandpass filtering means for selectively transmitting signals within a predetermined bandwidth,
    said bandpass filtering means including a bandwidth select terminal for receiving a bandwidth select signal for controlling said bandwidth,
    a source of a local oscillator signal,
    means for controlling the frequency of said local oscillator signal to select a desired audiofrequency channel,
    output mixing means for combining the output of said bandpass filtering means with said local oscillator signal to provide a difference frequency signal modulated with said binary signals,
    an output terminal,
    and low-pass filtering means for coupling only said difference frequency signal to said output terminal for delivery to a communication channel.

2. Apparatus in accordance with claim 1 and further comprising,
    a plurality of receiving means for receiving signals provided by said transmitting means when coupled to said communications channel with each of said receiving means comprising,
    an input terminal for coupling to said communications channel,
    a source of a receiver local oscillator signal,
    means for controlling the frequency of said receiver local oscillator,
    input mixing means having a signal input and a local oscillator input,
    means for coupling the latter local oscillator input to said source of a receiver local oscillator signal,
    filtering means for coupling said receiver input to said receiver input mixing means signal input whereby said mixing means provides a receiver intermediate audiofrequency signal centered about a predetermined intermediate frequency carrying the modulation of a transmitted signal on said communication channel of frequency related to the frequency of said receiver local oscillator signal,
    bandpass filtering means coupled to the output of said receiver input mixing means for selectively transmitting spectral components over a controllable bandwidth centered about said predetermined intermediate frequency and having a select bandwidth terminal for receiving a bandwidth select signal for controlling the bandwidth of the latter bandpass filtering means,
    a source of a bandwidth select signal coupled to said select bandwidth terminal,
    means for controlling both said bandwidth select signal and said means for controlling said receiver local oscillator signal to correspond with the selected bandwidth and frequency of an associated one of said transmitting means,
    and demodulating means coupled to the output of said receiver bandpass filtering means for providing an output signal having said first and second binary values represented by the binary signals provided by the modulating means of the associated transmitting means.

3. Digital data communicating apparatus in accordance with claim 2 wherein said bandpass filtering means comprises,
    a bandpass input terminal and a bandpass output terminal,
    first and second parallel channels each having input mixing means for combining an input signal on said bandpass input terminal with a local oscillator signal to provide a difference frequency signal of frequency corresponding to the frequency of said local oscillator signal and spectral components of the signal on said bandpass input terminal,
    low-pass filtering means for selectively transmitting spectral components below a predetermined audio cutoff frequency,
    output mixing means for combining the output of said low-pass filtering means with said local oscillator signal to provide a sum signal having spectral components of frequency corresponding to the sum of the frequency of spectral components transmitted by said low-pass filtering means and said local oscillator signal frequency,
    said bandpass filtering means further including means for cummulatively combining the sum signals from said first and second parallel channels to provide an output signal on the bandpass output terminal, said low-pass filtering means in said first channel having substantially the same transfer characteristic as the low-pass filtering means in said second channel, said source of a local oscillator signal providing a local oscillator signal to the first channel input and output mixing means substantially in phase quadrature with the local oscillator signal provided to the input and output mixing means in said second channel.

4. Digital data communicating apparatus in accordance with claim 3 and further comprising, fixed bandpass filtering means for rejecting undesired artifact spectral components, said fixed bandpass filter means intercoupling said bandpass input terminals and said input mixing means.

5. Digital data communicating apparatus in accordance with claim 3 wherein said low-pass filtering means comprises controlled integrator means having a controlled integrator input terminal and a controlled integrator output terminal for selectively integrating an input signal on the controlled integrator input terminal and having a differential amplifier having its output connected to said controlled integrator output terminal and ungrounded and grounded inputs with capacitive means for integrating connected between the differential amplifier output and the ungrounded input and resistive means for carrying current and switching means for selectively interrupting current connected in series between said controlled integrator input and said ungrounded input.

6. Digital data communicating apparatus in accordance with claim 5 wherein said capacitive means comprises inphase and quadrature capacitors connectd in series with inphase and quadrature switching means for selectively interrupting current respectively between the controlled integrator output and said ungrounded input, and means for closing said inphase and quadrature switching means during mutually exclusive alternating time intervals.

7. Digital data communicating apparatus in accordance with claim 3 and further comprising D.C. feedforward means connected in parallel with said low-pass filtering means between a low-pass input terminal and a low-pass output terminal, an output capacitor connected in series with the output of said low-pass filtering means and said low-pass output terminal, said feedforward means includes a resistor connected between the low-pass filter input and the low-pass filter output and coacting with said output capacitor to form an ultra-low-pass filter having no D.C. error with the main path through said low-pass filtering means and said output capacitor characterized by a pseudobandpass characteristic having a high-pass function which is exactly complimentary with the ultra-low-pass function of said resistor and output capacitor.

8. Digital data communicating apparatus in accordance with claim 2 wherein said source of a local oscillator signal includes switching means for providing an approximation of a sine wave represented by four levels to provide a local oscillator signal essentially free of spurious components at the third and fifth harmonics of the fundamental frequency of the local oscillator signal.

9. Digital data communicating apparatus in accordance with claim 2 wherein said demodulating means comprises a period detector.

10. Digital data communicating apparatus in accordance with claim 9 wherein said demodulating means includes nonlinear correction means for providing a signal that is identical to that which would be provided by a frequency demodulator.

11. Digital data communicating apparatus in accordance with claim 9 wherein said demodulating means includes limiting means for limiting the signal provided at the output of said receiver bandpass filtering means to provide a square wave at I.F. frequency, and said period detector comprises, a source of clock pulses, and a counter for counting the number of said clock pulses that occur between consecutive transition edges of the same sense of said square wave, and digital-to-analog converting means for converting the signal in digital form in said counter into an analog signal representative of the period of said square wave signal.

12. Digital data communicating apparatus in accordance with claim 11 wherein said limiting means includes means for sensing a deviation of said limiter square wave from 50% duty cycle to provide an error signal, and means for feeding back the error signal to said limiting means for adjusting the limiting values to values which reduce said deviation from 50% duty cycle.

13. Digital data communicating apparatus in accordance with claim 11 and further comprising, a data output terminal, normalizing low-pass filtering means of controlled bandwidth for coupling the output of said digital-to-analog converting means to said data output terminal, a source of a duty-cycle-controlled bandwidth signal coupled to said normalizing low-pass filter means for controlling the bandwidth and gain thereof so that the gain increases with decreasing bandwidth to provide a signal on said data output terminal of amplitude proportional to deviation from center frequency.

14. Digital data communicating apparatus in accordance with claim 1 wherein said bandpass filtering means comprises, a bandpass input terminal and a bandpass output terminal, first and second parallel channels each having input mixing means for combining an input signal on said bandpass input terminal with a local oscillator signal to provide a difference frequency signal of frequency corresponding to the frequency of said local oscillator signal and spectral components of the signal on said bandpass input terminal, low-pass filtering means for selectively transmitting spectral components below a predetermined audio cutoff frequency, output mixing means for combining the output of said low-pass filtering means with said local oscillator signal to provide a sum signal having spectral components of frequency corresponding to the sum of the frequency of spectral components transmitted by said low-pass filtering means and said local oscillator signal frequency, said bandpass filtering means further including means for cummulatively combining the sum signals from said first and second parallel channels to provide an output signal on the bandpass output terminal, said low-pass filtering means in said first channel having substantially the same transfer characteristic as the low-pass filtering means in said second channel, said source of a local oscillator signal providing a local oscillator signal to the first channel input and output mixing means substantially in phase quadrature with the local oscillator signal provided to the input and output mixing means in said second channel.

15. Digital data communicating apparatus in accordance with claim 14 wherein said low-pass filtering means comprising controlled integrator means having a controlled integrator input terminal and a controlled integrator output terminal for selectively integrating an input signal on the controlled integrator input terminal and having a differential amplifier having its output connected to said controlled integrator output terminal and ungrounded and grounded inputs with capactive means for integrating connected between the differential amplifier output and the ungrounded input and resistive means for carrying current and switching means for selectively interrupting current connected in series between said controlled integrator input and said ungrounded input.

16. Digital data communicating apparatus in accordance with claim 15 wherein said capacitive means comprises inphase and quadrature capacitors connectd in series with inphase and quadrature switching means respectively for selectively interrupting current respectively between the controlled integrator output and said ungrounded input, and means for closing said inphase and quadrature switching means during mutually exclusive alternating time intervals.

17. Digital data communicating apparatus in accordance with claim 14 and further comprising D.C. feedforward means connected in parallel with said low-pass filtering means between a low-pass input terminal and a low-pass output terminal, an output capacitor connected in series with the output of said low-pass filtering means and said low-pass output terminal, said feedforward means including a resistor connected between the low-pass filter input and the low-pass filter output and coacting with said output capacitor to form an ulta-low-pass filter having no D.C. error with the main path through said low-pass filtering means and said output capacitor characterized by a pseudobandpass characteristic having a high-pass function which is excactly complementary with the ultra-low-pass function of said resistor and output capacitor.

18. Digital data communicating apparatus in accordance with claim 1 wherein said bandpass filtering means comprises, a bandpass input terminal and a bandpass output terminal, first and second parallel channels each having low-pass filtering means for selectively transmitting spectral components below a predetermined audio cutoff frequency, output mixing means for combining the outputs of said low-pass filtering means with said local oscillator signal to provide a sum signal having spectral components of frequency corresponding to the sum of the frequency of spectral components transmitted by said low-pass filtering means and said local oscillator signal frequency, said bandpass filtering means further including means for cumulatively combining the sum signals from said first and second parallel channels to provide an output signal on the bandpass output terminal, said low-pass filtering means in said first channel having substantially the same transfer characteristic as the low-pass filtering means in said second channel, said source of a local oscillator signal providing a local oscillator signal to the first channel output mixing means substantially in phase quadrature with the local oscillator signal provided to the output mixing means in said second channel.

19. Digital data communicating apparatus in accordance with claim 1 wherein said source of a local oscillator signal includes switching means for providing an approximation of a sine wave represented by four levels to provide a local oscillator signal essentially free of spurious components at the third and fifth harmonics of the fundamental frequency of the local oscillator signal.

20. Digital data communicating apparatus in accordance with claim 1 wherein said modulating means includes frequency shift keying means for providing said first and second binary signals as signals of first and second frequencies respectively created in the complex frequency domain at real frequencies just above D.C.

21. Digital data communicating apparatus in accordance with claim 20 and further comprising means for establishing 0 Hz as a center frequency and providing said first binary signal as corresponding to a linearly increasing phase of said signal of first frequency and said second binary value as a linearly decreasing phase of said signal of second frequency.

22. Digital data communicating apparatus in accordance with claim 21 wherein said modulating means comprises a source of a clock signal, phase counting means for counting said clock signal, means for designating said first binary value by causing said phase counting means to count up, and means for designating said seondary binary value by causing said phase counting means to count down.

23. Digital data communicating apparatus in accordance with claim 22 and further comprising means for inhibiting said phase counting means from counting said clock signal, and means responsive to said phase counting means not counting for providing a carrier signal representation which is different from both said first and second binary signals.

24. Digital data communicating apparatus comprising, at least one receiving means for receiving signals provided by an associated transmitting means when coupled to a communications channel, said receiving means comprising, an input terminal for coupling to said communications channel, a source of a receiver local oscillator signal, means for controlling the frequency of said receiver local oscillator, input mixing means having a signal input and a local oscillator input, means for coupling the latter local oscillator input to said source of a receiver local oscillator signal, filtering means for coupling said receiver input to said receiver input mixing means signal input whereby said mixing means provides a receiver intermediate audiofrequency signal centered about a predetermined intermediate frequency carrying the modulation of a transmitted signal on said communication channel of frequency related to the frequency of said receiver local oscillator signal, bandpass filtering means coupled to the output of said receiver input mixing means for selectively transmitting spectral components over a controllable bandwidth centered about said predetermined intermediate frequency and having a select bandwidth terminal for receiving a bandwidth select signal for controlling the bandwidth of the latter bandpass filtering means, a source of a bandwidth select signal coupled to said select bandwidth terminal, means for controlling both said bandwidth select signal and said means for controlling said receiver local oscillator signal to correspond with the selected bandwidth and frequency of an associated transmitted signal, and demodulating means coupled to the output of said receiver bandpass filtering means for providing an output signal having first and second binary values represented by binary signals carried by the associated transmitted signal.

25. Digital data communicating apparatus in accordance with claim 24 wherein said bandpass filtering means comprises, a bandpass input terminal and a bandpass output terminal, first and second parallel channels each having input mixing means for combining an input signal on said bandpass input terminal with a local oscillator signal to provide a difference frequency signal of frequency corresponding to the frequency of said local oscillator signal and spectral components of the signal on said bandpass input terminal, low-pass filtering means for selectively transmitting spectral components below a predetermined audio cutoff frequency, output mixing means for combining the output of said low-pass filtering means with said local oscillator signal to provide a sum signal having spectral components of frequency corresponding to the sum of the frequency of spectral components transmitted by said low-pass filtering means and said local oscillator signal frequency, said bandpass filtering means further including means for cummulatively combining the sum signals from said first and second parallel channels to provide an output signal on the bandpass output terminal, said low-pass filtering means in said first channel having substantially the same transfer characteristic as the low-pass filtering means in said second channel, said source of a local oscillator signal providing a local oscillator signal to the first channel input and output mixing means substantially in phase quadrature with the local oscillator signal provided to the input and output mixing means in said second channel.

26. Digital data communicating apparatus in accordance with claim 25 and further comprising, fixed bandpass filtering means for rejecting undesired artifact spectral components, said fixed bandpass filter means intercoupling said bandpass input terminals and said input mixing means.

27. Digital data communicating apparatus in accordance with claim 25 wherein said low-pass filtering means comprises controlled integrator means having a controlled integrator input terminal and a controlled integrator output terminal for selectively integrating an input signal on the controlled integrator input terminal and having a differential amplifier having its output connected to said controlled integrator output terminal and ungrounded and grounded inputs with capacitive means for integrating connected between the differential amplifier output and the ungrounded input and resistive means for carrying current and switching means for selectively interrupting current connected in series between said controlled integrator input and said ungrounded input.

28. Digital data communicating apparatus in accordance with claim 27 wherein said capacitive means comprises inphase and quadrature capacitors connectd in series with inphase and quadrature switching means for selectively interrupting current respectively between the controlled integrator output and said ungrounded input, and means for closing said inphase and quadrature switching means during mutually exclusive alternating time intervals.

29. Digital data communicating apparatus in accordance with claim 25 and further comprising D.C. feedforward means connected in parallel with said low-pass filtering means between a low-pass input terminal and a low-pass output terminal, an output capacitor connected in series with the output of said low-pass filtering means and said low-pass output terminal, said feedforward means including a resistor connected between the low-pass filter input and the low-pass filter output and coacting with said output capacitor to form an ultra-low-pass filter having no D.C. error with the main path through said low-pass filtering means and said output capacitor characterized by a pseudobandpass characteristic having a high-pass function which is exactly complimentary with the ultra-low-pass function of said resistor and output capacitor.

30. Digital data communicating apparatus in accordance with claim 24 wherein said source of a local oscillator signal includes switching means for providing an approximation of a sine wave represented by four levels to provide a local oscillator signal essentially free of spurious components at the third and fifth harmonics of the fundamental frequency of the local oscillator signal.

31. Digital data communicating apparatus in accordance with claim 24 wherein said demodulating means comprises a period detector.

32. Digital data communicating apparatus in accordance with claim 31 wherein said demodulating means includes nonlinear correction means for providing a signal that is identical to that which would be provided by a frequency demodulator.

33. Digital data communicating apparatus in accordance with claim 31 wherein said demodulating means includes limiting means for limiting the signal provided at the output of said receiver bandpass filtering means to provide a square wave at I.F. frequency, and said period detector comprises, a source of clock pulses, and a counter for counting the number of said clock pulses that occur between consecutive transition edges of the same sense of said square wave, and digital-to-analog converting means for converting the signal in digital form in said counter into an analog signal representative of the period of said square wave signal.

34. Digital data communicating apparatus in accordance with claim 33 wherein said limiting means includes means for sensing a deviation of said limiter square wave from 50% duty cycle to provide an error signal, and means for feeding back the error signal to said limiting means for adjusting the limiting values to values which reduce said deviation from 50% duty cycle.

35. Digital data communicating apparatus in accordance with claim 33 and further comprising, a data output terminal, normalizing low-pass filtering means of controlled bandwidth for coupling the output of said digital-to-analog converting means to said data output terminal, a source of a duty-cycle-controlled bandwidth signal coupled to said normalizing low-pass filter means for controlling the bandwidth and gain thereof so that the gain increases with decreasing bandwidth to provide a signal on said data output terminal of amplitude proportional to deviation from center frequency.

* * * * *